US012673491B2

(12) United States Patent
Kiji

(10) Patent No.: US 12,673,491 B2

(45) Date of Patent: Jul. 7, 2026

(54) LIQUID EJECTION HEAD

(71) Applicant: RISO Technologies Corporation, Tokyo (JP)

(72) Inventor: Yasuhito Kiji, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 149 days.

(21) Appl. No.: 18/412,600

(22) Filed: Jan. 15, 2024

(65) Prior Publication Data

US 2024/0253349 A1 Aug. 1, 2024

(30) Foreign Application Priority Data

Jan. 26, 2023 (JP) ................................. 2023-010538

(51) Int. Cl.
*B41J 2/045* (2006.01)

(52) U.S. Cl.
CPC ....... *B41J 2/04588* (2013.01); *B41J 2/04541* (2013.01); *B41J 2/04548* (2013.01); *B41J 2/0455* (2013.01); *B41J 2/04573* (2013.01); *B41J 2/04581* (2013.01)

(58) Field of Classification Search
CPC .................................................... B41J 2/40596
See application file for complete search history.

(56) References Cited

U.S. PATENT DOCUMENTS 8,777,349 B2 7/2014 Tobita et al.
2006/0284908 A1* 12/2006 Iwao .................... B41J 2/14201 347/9
2007/0257948 A1 11/2007 Kim
2008/0049056 A1 2/2008 Teramae
2009/0295853 A1 12/2009 Hosono
2010/0103212 A1* 4/2010 Tabata ................. B41J 2/04548 347/10
2014/0125722 A1* 5/2014 Otokita .................. B41J 2/0451 347/11
2022/0016884 A1 1/2022 Reinten
2023/0302793 A1 9/2023 Kiji
2024/0140088 A1* 5/2024 Mizouchi ............. B41J 2/04588
2024/0253348 A1 8/2024 Kiji
2024/0253349 A1 8/2024 Kiji

FOREIGN PATENT DOCUMENTS

JP 2008237952 A * 10/2008

OTHER PUBLICATIONS

U.S. Appl. No. 18/412,604, filed Jan. 15, 2024.
U.S. Appl. No. 18/412,613, filed Jan. 15, 2024.

* cited by examiner

*Primary Examiner* — Shelby L Fidler
(74) *Attorney, Agent, or Firm* — Kim & Stewart LLP

(57) ABSTRACT

In an embodiment, a liquid ejection head includes a nozzle plate, a pressure chamber, an actuator, and a drive circuit. The actuator varies a volume of the pressure chamber in response to a driving signal from the drive circuit. The driving signal includes an ejection waveform for ejecting liquid from a nozzle and a cancellation waveform for suppressing residual oscillation after ejection of the liquid. The ejection waveform includes voltage changes in stages and the cancellation waveform includes two waveform portions for suppressing residual oscillations and higher harmonic acoustic resonance frequencies.

18 Claims, 14 Drawing Sheets

*FIG. 8*

| WAVEFORM | LEADING DROP VOLUME (pL) | TOTAL EJECTION VOLUME (pL) | LEADING DROP / TOTAL EJECTION | EJECTION VOLTAGE (V) |
|---|---|---|---|---|
| tr=0.2 μs | 0.4 | 2.5 | 0.16 | 15.7 |
| Tm=0.46 μs | 1.1 | 3.3 | 0.33 | 19.0 |
| Tm=0.62 μs | 1.6 | 3.5 | 0.46 | 21.1 |
| Tm=0.77 μs | 1.8 | 3.4 | 0.53 | 21.9 |
| Tm=0.93 μs | 1.7 | 3.1 | 0.55 | 22.1 |
| Tm=1.08 μs | 1.3 | 2.8 | 0.46 | 21.4 |
| Tm=1.23 μs | 1.2 | 2.4 | 0.50 | 21.3 |
| Tm=1.39 μs | 1.3 | 2.7 | 0.48 | 23.3 |

LIQUID EJECTION HEAD

CROSS-REFERENCE TO RELATED APPLICATION

This application is based upon and claims the benefit of priority from Japanese Patent Application No. 2023-010538, filed Jan. 26, 2023, the entire contents of which are incorporated herein by reference.

FIELD

Embodiments described herein relate generally to a liquid ejection head.

BACKGROUND

In the related art, there is known technique of controlling the timing of meniscus oscillation and suppressing satellite droplets ("satellites") by adjusting the rise time or fall time of a drive waveform that ejects liquid from a liquid ejection head. In such a liquid ejection head, residual oscillation occurs after the liquid has been ejected. Therefore, a liquid ejection head capable of suppressing the residual oscillation is desired.

BRIEF DESCRIPTION OF THE DRAWINGS

FIG. 8 is a table of drive waveform parameters and ejected liquid droplet characteristics for an example of a liquid ejection head.

DETAILED DESCRIPTION

An object of the present embodiment is to provide a liquid ejection head capable of controlling residual oscillation.

In general, according to one embodiment, a liquid ejection head includes a nozzle plate including a nozzle, a pressure chamber fluidly connected to the nozzle, an actuator configured to vary a volume of the pressure chamber in response to a driving signal, and a drive circuit configured to generate the driving signal for driving the actuator. The driving signal generated by the drive circuit includes an ejection waveform for ejecting liquid from the nozzle and a cancellation waveform for suppressing residual oscillation after the ejection of the liquid. The cancellation waveform includes a first waveform portion and a second waveform portion, and the second waveform portion cancels oscillation that has an acoustic resonance frequency higher than a main acoustic resonance frequency of the liquid in the pressure chamber and is caused by the first waveform portion.

Figure 1:
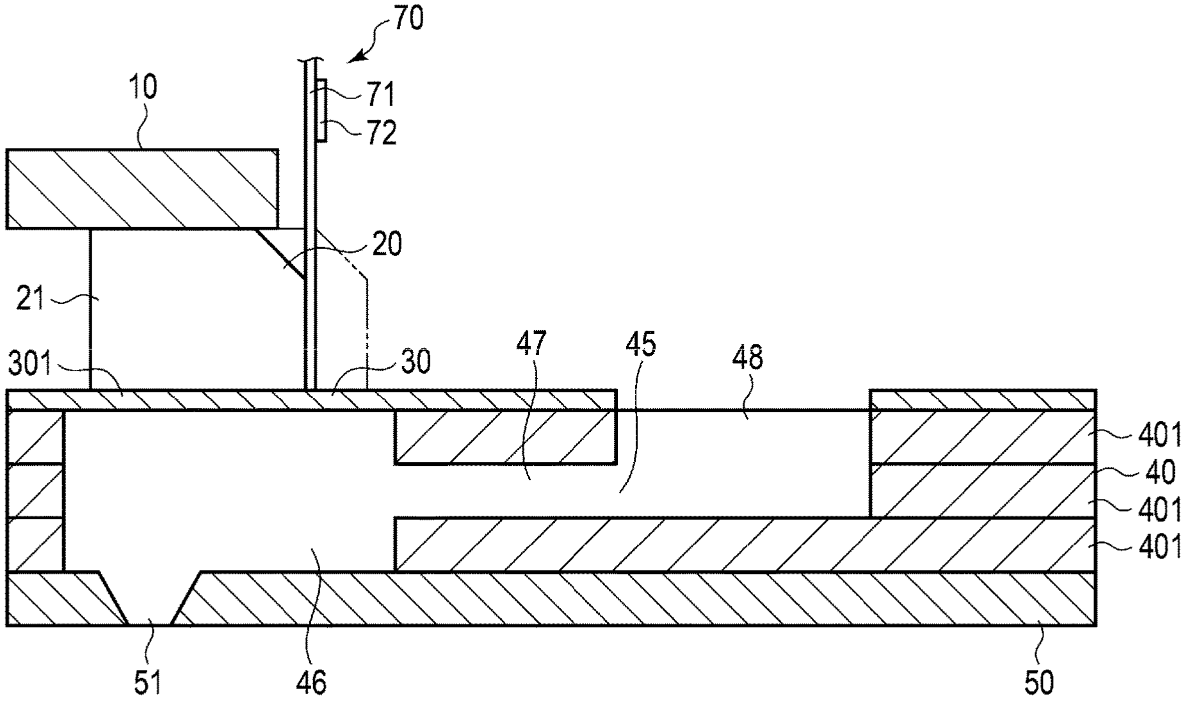
FIG. 1 is a cross-sectional view illustrating aspects of the configuration of a liquid ejection head according to an embodiment.
Figure 2:
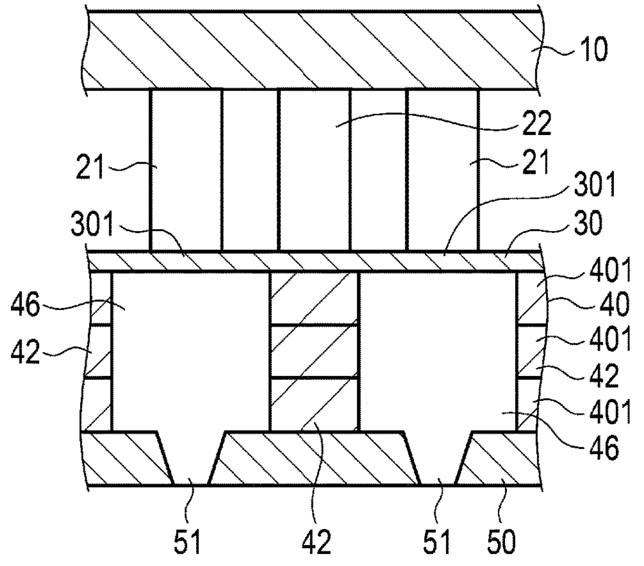
FIG. 2 is a cross-sectional view illustrating aspects of the configuration of a liquid ejection head.
Figure 3:
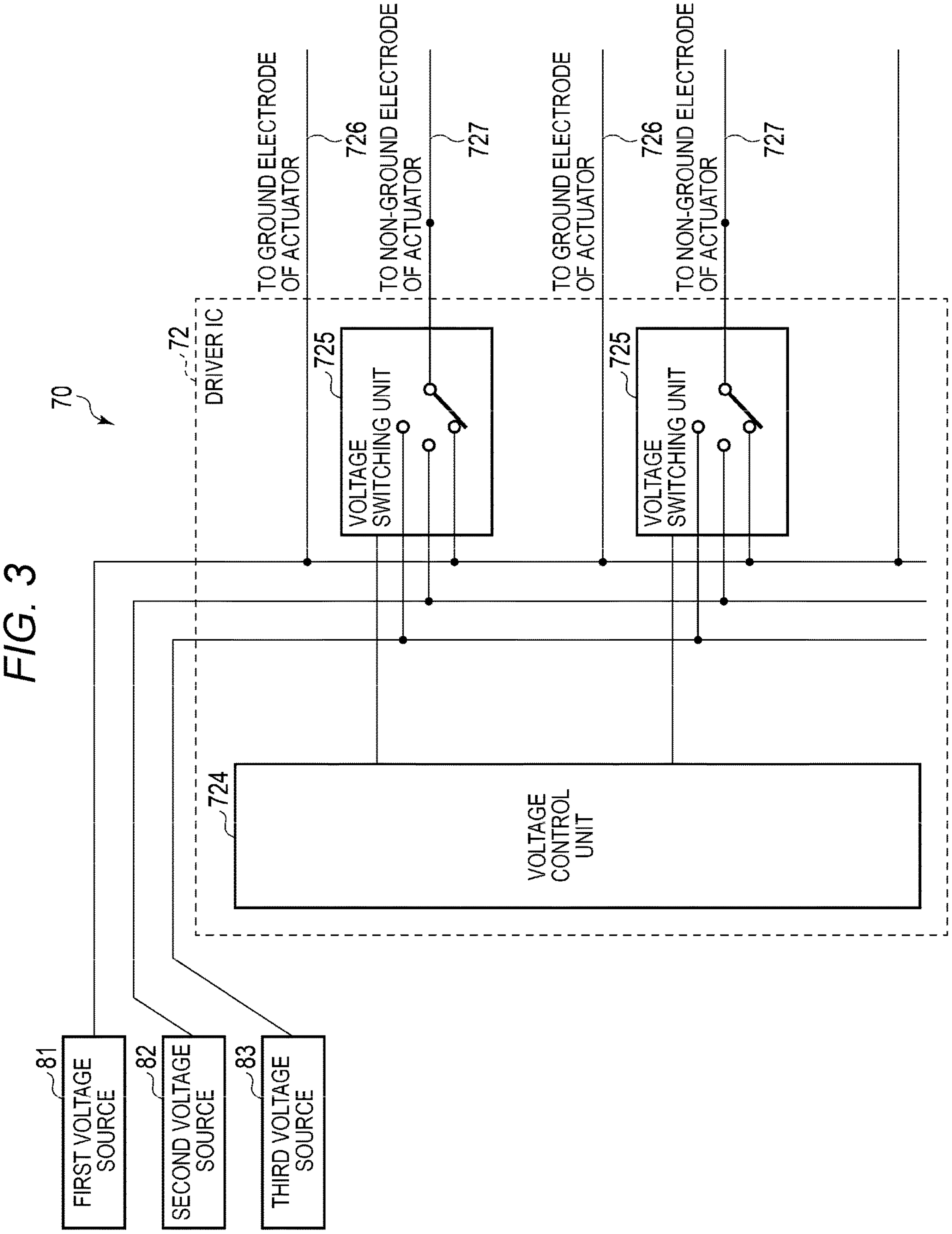
FIG. 3 is a block diagram schematically illustrating a drive circuit for a liquid ejection head.
Figure 4:
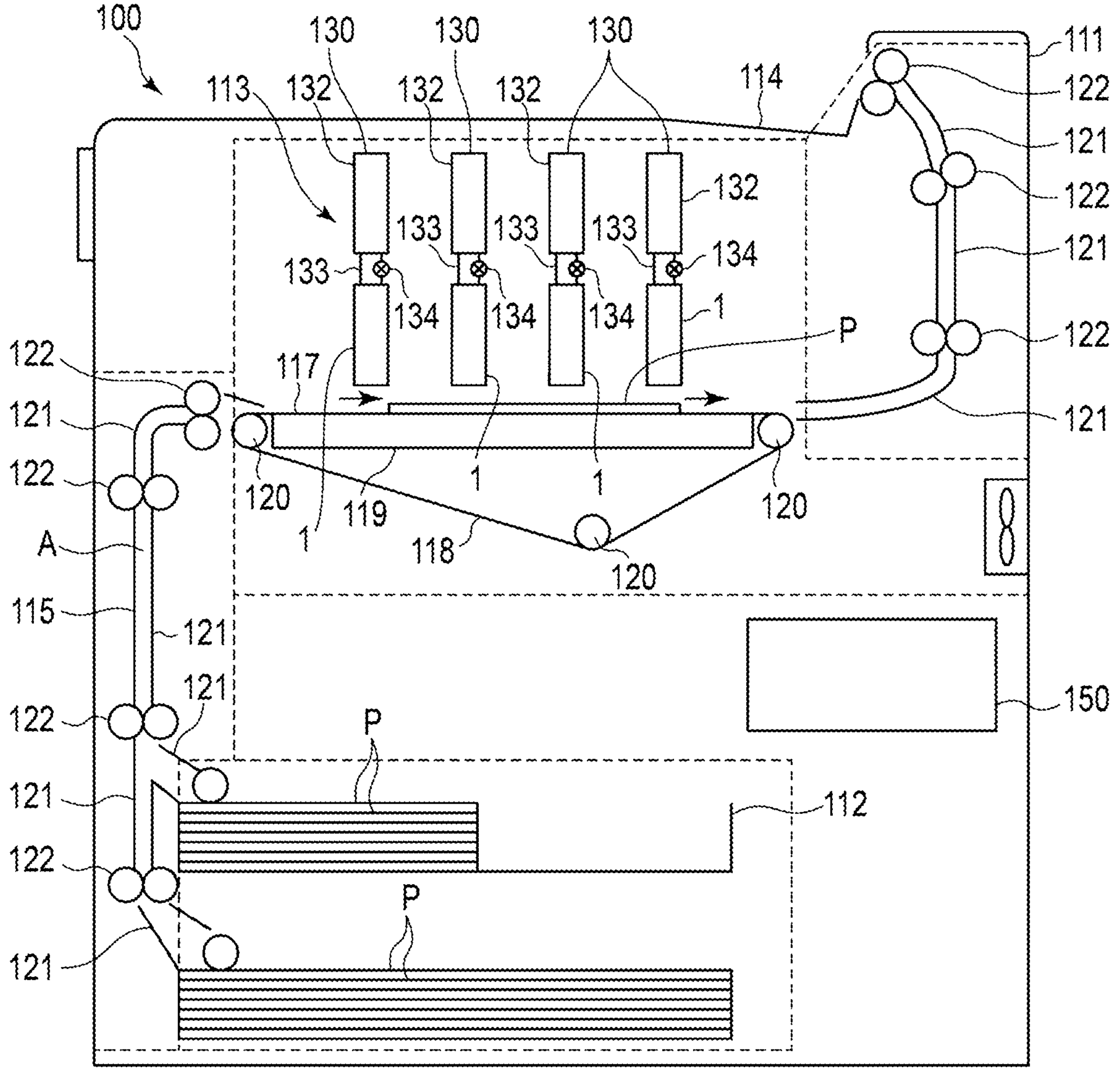
FIG. 4 depicts a configuration of a liquid ejection device incorporating a liquid ejection head.
Figure 5:
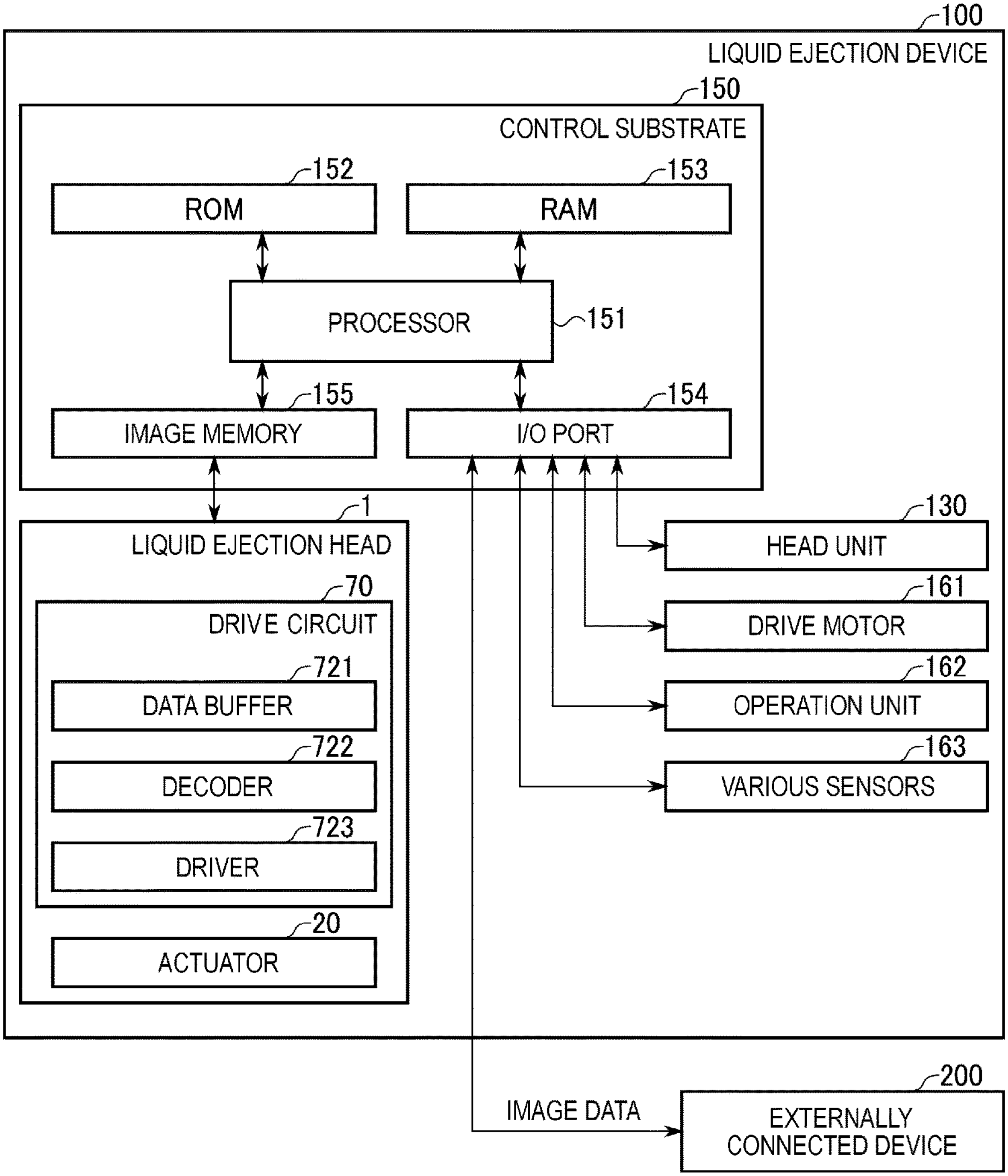
FIG. 5 is a block diagram illustrating an example of the configuration of a liquid ejection device.

A configuration of a liquid ejection head 1 and a liquid ejection device 100 incorporating the liquid ejection head 1 according to an embodiment will be described with reference to FIGS. 1 to 5. FIG. 1 is a cross-sectional view illustrating the configuration of the liquid ejection head 1 according to the embodiment with the configuration partially omitted, and FIG. 2 is a cross-sectional view illustrating the configuration of the liquid ejection head 1 according to the embodiment with the configuration partially omitted. FIG. 3 is a block diagram schematically illustrating the configuration of a drive circuit 70 for the liquid ejection head 1 according to the embodiment. FIG. 4 is an explanatory diagram illustrating a configuration of the liquid ejection device 100 incorporating the liquid ejection head 1 according to the embodiment. FIG. 5 is a block diagram illustrating an example of the configuration of the liquid ejection device 100 according to the embodiment. Note that in each figure, for the sake of explanation, aspects may be illustrated in an enlarged, reduced, or omitted manner, as appropriate.

The liquid ejection head 1 according to the present embodiment is, for example, an inkjet head that ejects ink. As illustrated in FIGS. 1 and 2, the liquid ejection head 1 includes a base 10, an actuator 20, a diaphragm 30, a channel plate 40, a nozzle plate 50 having a plurality of nozzles 51, and the drive circuit 70.

The base 10 is formed in, for example, a rectangular plate shape. The actuator 20 is joined to the base 10.

The actuator 20 comprises a piezoelectric material including piezoelectric columns 21 and non-driven piezoelectric columns 22 alternately arranged with the plurality of piezoelectric columns 21. The actuator 20 is formed in a comb teeth shape obtained by arranging the plurality of piezoelectric columns 21 and the plurality of non-driven piezoelectric columns 22 at predetermined intervals in one direction. For example, the actuator 20 is formed by cutting grooves into a stacked piezoelectric member joined to the base 10 to form the plurality of piezoelectric columns (remaining material is in a rectangular columnar shape) at predetermined intervals. Also, the plurality of piezoelectric columns formed have electrodes. That is, one end side (the diaphragm 30 side) of the actuator 20 is divided by a plurality of grooves while the other end side (the base 10 side) remains connected (uncut).

For example, the stacked piezoelectric material that configures the actuator 20 is formed by stacking and sintering sheets of piezoelectric material. As a specific example, as illustrated in FIGS. 1 and 2, the piezoelectric columns 21 and the non-driven piezoelectric columns 22 are, for example, stacked piezoelectric bodies. These columns may be referred to as driving elements in some instances. The piezoelectric columns 21 and the non-driven piezoelectric columns 22 include a plurality of stacked piezoelectric layers, a plurality of internal electrodes in between the stacked piezoelectric layers, and a plurality of external electrodes. In this example, the piezoelectric columns 21 and the non-driven piezoelectric columns 22 are the same configuration.

The piezoelectric layer is made of a piezoelectric material such as PZT (lead zirconate titanate) or lead-free KNN (sodium potassium niobate) in a thin plate shape. The plurality of piezoelectric layers are stacked in the thickness direction and are adhered by sintering. Note that, here, the stacking direction of the plurality of piezoelectric layers is perpendicular to the arrangement direction of the plurality of piezoelectric columns 21 and the plurality of non-driven piezoelectric columns 22.

The internal electrode is a conductive film made of a sinterable conductive material such as silver palladium and formed into a predetermined shape. The internal electrode is formed in a predetermined region of the surface of each piezoelectric layer. The plurality of internal electrodes are configured to have different polarities of voltages applied thereto alternately in the arrangement direction.

The external electrodes are formed on the outer surfaces of the plurality of piezoelectric columns 21 and the plurality of non-driven piezoelectric columns 22. The external electrodes connect to (collect) the end portions of certain ones of the internal electrodes. The external electrode can be formed of nickel (Ni), chromium (Cr), gold (Au), or the like by a known method such as plating or sputtering. The external electrodes are arranged on different sides of the piezoelectric columns 21 and non-driven piezoelectric columns 22 and are configured to have different (e.g., opposite) voltage polarities applied thereto. In some examples, the different external electrodes (with different polarities) may be routed to different regions on the same side of the plurality of piezoelectric columns 21 and the plurality of non-driven piezoelectric columns 22.

As an example, in the present embodiment, the plurality of external electrodes include individual (separate) electrodes respectively formed on the plurality of piezoelectric columns 21 and the plurality of non-driven piezoelectric columns 22 and also common electrodes formed by connecting the plurality of piezoelectric columns 21 and the plurality of non-driven piezoelectric columns 22. The plurality of individual electrodes formed respectively on the plurality of piezoelectric columns 21 and the plurality of non-driven piezoelectric columns 22 are independently arranged (e.g., addressable). The common electrodes are, for example, grounded.

These external electrodes are connected, for example, to a drive circuit 70. For example, the individual external electrodes are connected to a control unit 150 (driving unit) via a driver 723 of the drive circuit 70 by wiring and are configured to be separately drive-controllable under the control of a processor 151.

The piezoelectric column 21 and the non-driven piezoelectric column 22 oscillate longitudinally along the stacking direction of the piezoelectric layers when a voltage is applied to the internal electrodes via the external electrodes. The longitudinal oscillation referred to here is, for example, "oscillation in the thickness direction defined by the piezoelectric constant d33". For example, as illustrated in FIG. 2, the plurality of alternately arranged piezoelectric columns 21 are arranged to correspond to pressure chambers 46 with the diaphragm 30 interposed therebetween, and the non-driven piezoelectric columns 22 are arranged at positions facing partition wall portions 42 with the diaphragm 30 interposed therebetween.

The piezoelectric columns 21 oscillate longitudinally with the application of a voltage and displace the diaphragm 30. That is, the piezoelectric columns 21 deform the pressure chambers 46. The non-driven piezoelectric columns 22 are arranged at positions facing the partition wall portions 42. A drive voltage is not applied to the non-driven piezoelectric columns 22. That is, the piezoelectric column 21 configures an actuator that deforms a pressure chamber 46 when driven, and the non-driven piezoelectric column 22 forms a support column or the like. That is, the piezoelectric column 21 expands and contracts the pressure chamber 46 to vary the volume of the pressure chamber 46.

The diaphragm 30 is joined to one side of the piezoelectric layers of the plurality of piezoelectric columns 21 and 22 in the stacking direction, that is, on the surface on the nozzle plate 50 side. The diaphragm 30 is deformed, for example, by the driving of the piezoelectric columns 21. The diaphragm 30 is joined to the piezoelectric columns 21 and the non-driven piezoelectric columns 22 of the actuator 20.

The diaphragm 30 has a flat plate shape disposed, for example, so that the thickness direction is the stacking direction of the piezoelectric layers. The surface direction of the diaphragm 30 extends in the arrangement direction of the plurality of piezoelectric columns 21 and the plurality of non-driven piezoelectric columns 22. The diaphragm 30 is, for example, a metal plate. The diaphragm 30 includes a plurality of oscillation parts 301 that face each pressure chamber 46 and are individually displaceable. The diaphragm 30 is formed by integrally connecting the plurality of oscillation parts 301.

The diaphragm 30 may be configured in a flat plate shape as one sheet, and the regions joined to the piezoelectric columns 21 may be individually displaced. The diaphragm 30 is configured, for example, as a stainless steel (SUS) plate. In some examples, the diaphragm 30 may incorporate folds, bends, or steps formed in portions adjacent to the oscillation parts 301 or between the oscillation parts 301 adjacent to each other so that the plurality of oscillation parts 301 can be more easily displace.

The diaphragm 30 expands and contracts the pressure chambers 46 by displacement of parts facing the corresponding piezoelectric columns 21 by the expansion and contraction of the piezoelectric columns 21 occurring due to the longitudinal oscillation of the piezoelectric columns 21, thereby varying the volume of the pressure chambers 46.

In the diaphragm 30, one side is joined to the actuator 20, and the other side is joined to the channel plate 40. The pressure chamber 46 is formed in the space between the diaphragm 30 and the channel plate 40. During operations, the space can be filled with ink.

The diaphragm 30 faces each of the piezoelectric columns 21 and 22 on one side, and the other side of the diaphragm 30 faces the pressure chambers 46 and the partition wall portions 42.

The channel plate 40 is joined to the diaphragm 30. The channel plate 40 is disposed between the nozzle plate 50 and the diaphragm 30. The channel plate 40 includes the plurality of partition wall portions 42. Also, the channel plate 40 forms a channel 45. The channel plate 40 forms the plurality of partition wall portions 42 and the channel 45, for example, from the stacking of a plurality of plates 401 that are partially open.

The partition wall portions 42 are arranged in the arrangement direction of the plurality of piezoelectric columns 21 and 22 and face the non-driven piezoelectric columns 22 via the diaphragm 30. The partition wall portions 42 separate between the plurality of pressure chambers 46 of the channel 45 and between a plurality of individual channels 47.

The channel 45 includes the plurality of pressure chambers 46 separated by the partition wall portions 42, the plurality of individual channels 47 separated by the partition wall portions 42, and a common channel 48 that communicates with the plurality of individual channels 47.

The plurality of pressure chambers 46 are arranged in the arrangement direction of the plurality of piezoelectric columns 21 and the plurality of non-driven piezoelectric columns 22 and face the plurality of piezoelectric columns 21 via the diaphragm 30. The plurality of pressure chambers 46 arranged in one direction are separated by the partition wall portions 42. The plurality of partition wall portions 42 arranged between the plurality of pressure chambers 46 face the plurality of non-driven piezoelectric columns 22 via the diaphragm 30. The plurality of pressure chambers 46 are formed so that one side of the channel plate 40 is closed by the diaphragm 30 in the stacking direction of the piezoelectric layer, and the other side thereof is closed by the nozzle plate 50. In addition, the nozzles 51 formed in the nozzle plate 50 are arranged in the pressure chambers 46.

The pressure chambers 46 communicate with the common channel 48 via the individual channels 47. The pressure chamber 46 stores a liquid to be supplied from the common channel 48 via the individual channel 47 and ejected from the nozzle 51 by deforming (oscillating) the diaphragm 30 portion that partially forms the pressure chamber 46. The individual channel 47 connects the common channel 48 and the pressure chamber 46. The individual channels 47 are provided in the same number as the number of the pressure chambers 46. The channel cross-sectional shape of the individual channel 47 can be different from the channel cross-sectional shape of the pressure chamber 46. The channel cross-sectional area of the individual channel 47 is generally smaller than the channel cross-sectional area of the pressure chamber 46. The common channel 48 is fluidly connected to the plurality of individual channels 47 and communicates with the pressure chambers 46 via each individual channel 47.

The nozzle plate 50 is formed, for example, by a metal such as SUS/Ni or a resin material such as polyimide. The nozzle plate 50 is joined to the channel plate 40 and covers the plurality of pressure chambers 46. The nozzle plate 50 includes the plurality of nozzles 51 formed at positions facing the plurality of pressure chambers 46 and penetrating in the thickness direction. A nozzle row is formed by a plurality of nozzles 51.

As illustrated in FIG. 5, the drive circuit 70 includes a data buffer 721, a decoder 722, and the driver 723. The data buffer 721 stores print data for each of the piezoelectric columns 21 in a chronological (time) order. The decoder 722 controls the driver 723 based on the print data stored in the data buffer 721 for each of the piezoelectric columns 21. The driver 723 outputs a driving signal for operating each of the piezoelectric columns 21 as appropriate based on the control of the decoder 722. The driving signal is a voltage to be applied to each of the piezoelectric columns 21.

As a specific example, as illustrated in FIG. 1, the drive circuit 70 includes a wiring film 71 of which one end is connected to an external electrode, a driver IC 72 mounted on the wiring film 71, and a print wiring substrate mounted on the other end of the wiring film 71. For example, the driver IC 72 includes the data buffer 721, the decoder 722, and the driver 723. Note that a configuration in which a part of the data buffer 721, the decoder 722, and the driver 723 are included in the driver IC 72, and the like is included on the print wiring substrate or the like may be possible.

The drive circuit 70 drives the piezoelectric columns 21 by applying the driving voltage to the external electrode by the driver IC 72, varies the volume of the pressure chamber 46, and ejects the liquid droplet from the nozzles 51.

The wiring film 71 is connected to the plurality of individual electrodes and the common electrode. For example, the wiring film 71 can be an anisotropic conductive film (ACF) fixed to the connection portion of the external electrode by thermocompression bonding or the like. The wiring film 71 can be, for example, a chip on film (COF) on which the driver IC 72 is installed.

The driver IC 72 is connected to an external electrode via the wiring film 71. Note that the driver IC 72 may be connected to the external electrodes by other methods such as an anisotropic conductive paste (ACP), a non-conductive film (NCF), and a non-conductive paste (NCP) instead of the wiring film 71.

The driver IC 72 is applied to each of the piezoelectric columns 21 and generates a control signal and a driving signal for operating the piezoelectric columns 21. The driver IC 72 generates a control signal for controlling a timing for ejecting ink and the selection of the piezoelectric column 21 for ejecting the ink according to the image signal input from the control unit 150 of the liquid ejection device 100. Also, the driver IC 72 generates a voltage to be applied to the piezoelectric column 21 according to the control signal, that is, a driving signal (electric signal). If the driver IC 72 applies the driving signal to the piezoelectric column 21, the piezoelectric column 21 drives by displacing the diaphragm 30 which varies the volume of the pressure chamber 46 by being expanded and contracted. Accordingly, the ink in the pressure chamber 46 experiences a pressure oscillation. Due to the pressure oscillation, the ink can be ejected from the nozzles 51 associated with the pressure chambers 46. Note that the liquid ejection head 1 may realize gradation expression (e.g., gray scale) by changing the volume of ink droplets that land per one pixel. In addition, the liquid ejection head 1 may change the number of the ink droplets that lands per one pixel by changing the number of times of the ejection of the ink. In this manner, the driver IC 72 is an example of an application unit that applies a driving signal to the piezoelectric column 21.

Next, as illustrated in FIG. 3, an example of the drive circuit 70 is described. The drive circuit 70 includes in the driver IC 72, for example, a voltage control unit 724 and voltage switching units 725 in the same number as the number of the pressure chambers 46. However, in FIG. 3, just two voltage switching units 725 are illustrated as representative, and the other voltage switching units 725 are not separately illustrated.

The drive circuit 70 is connected to a first voltage source 81, a second voltage source 82, and a third voltage source 83. The drive circuit 70 applies the voltage supplied from the first voltage source 81 to each wiring electrode 726. Note that the drive circuit 70 applies the voltage supplied from the first voltage source 81, the second voltage source 82, and the third voltage source 83 selectively to each wiring electrode 727. Here, if the actuator 20 is a stacked PZT, the actuator 20 may be deteriorated in the case of application of a bipolar voltage. Therefore, the voltage supplied by the first voltage source 81, the second voltage source 82, and the third voltage source 83 is the ground voltage and one of positive and negative polarities with respect to the ground voltage.

For example, the output voltage of the first voltage source 81 is the ground voltage, and the voltage value thereof is indicated as V0 (V0=0 V). Also, the voltage value indicated by the output voltage of the second voltage source 82 is indicated as V1. Here, the voltage value V1 is the voltage higher than V0. The voltage value indicated by the output voltage of the third voltage source 83 is indicated as V2. In this example, the voltage value V2 is a voltage higher than V0 but lower than V1.

A wiring electrode 726 is connected to a common electrode as the ground electrode of the actuator 20. The plurality of wiring electrodes 727 are connected to individual electrodes as non-ground electrodes of the actuator 20, respectively.

The voltage control unit 724 is connected to each of the plurality of voltage switching units 725. The voltage control unit 724 outputs a command indicating which voltage source of the first voltage source 81, the second voltage source 82, and the third voltage source 83 is to be selected, to each of the voltage switching units 725. For example, the voltage control unit 724 receives an image signal from the control unit 150 and accordingly determines a switch timing of the voltage source in each voltage switching unit 725. Also, the voltage control unit 724 outputs a command for selecting any one of the first voltage source 81, the second voltage source 82, and the third voltage source 83 to the voltage switching unit 725 at a determined switch timing. The voltage switching unit 725 switches the voltage source connected to the wiring electrode 727 according to the command from the voltage control unit 724.

The voltage switching unit 725 is configured, for example, as a semiconductor switch. The voltage switching unit 725 connects any one of the first voltage source 81, the second voltage source 82, and the third voltage source 83 to the wiring electrode 727 by the control of the voltage control unit 724. However, the internal electrode having a polarity different from the piezoelectric column 21 is connected to the wiring electrode 726 and the wiring electrode 727 via an external electrode (common electrode and individual electrode).

The drive circuit 70 inputs a drive waveform having at least three types of potential differences as the driving signal between the electrodes of the actuator 20 by switching the connection wiring between the voltage sources 81, 82, and 83 and the actuator 20 by the switching circuit including the voltage control unit 724 and the plurality of voltage switching units 725. Here, the drive waveforms are the ejection waveform for ejecting the liquid droplet by the driving of the actuator 20 and a cancellation waveform for cancelling a residual waveform generated in the pressure chamber 46 driven by the input of the ejection waveform. Note that in the present discussion, any potential difference other than the largest potential difference and the smallest potential difference is referred to as an intermediate potential difference.

The print wiring substrate is a printing wiring assembly (PWA) on which various electronic components and connectors are mounted. The print wiring substrate is connected to the control unit 150 of the liquid ejection device 100.

Next, an example of the liquid ejection device 100 including the liquid ejection head 1 is described with reference to FIGS. 4 and 5. The liquid ejection device 100 is, for example, an inkjet recording device. The liquid ejection device 100 includes a housing 111, a medium supply unit 112, an image forming unit 113, a medium discharge unit 114, and a conveyance device 115. Also, the liquid ejection device 100 includes the control unit 150.

The liquid ejection device 100 is a liquid ejection device that performs image forming process on paper P by ejecting liquid such as ink while conveying, for example, the paper P as a printing medium that is an ejection target along a predetermined conveyance path A from the medium supply unit 112 to the medium discharge unit 114 via the image forming unit 113.

The housing 111 forms the outer shell of the liquid ejection device 100. A discharge port through which the paper P can be discharged to the outside is provided in the housing 111.

The medium supply unit 112 includes a plurality of paper feed cassettes and is configured to be able to stack and hold a plurality of sheets of paper P of various sizes.

The medium discharge unit 114 includes a paper discharge tray configured to be able to hold the paper P discharged from the discharge port.

The image forming unit 113 includes a support unit 117 that supports the paper P and a plurality of head units 130 arranged to face the upper side of the support unit 117.

The support unit 117 includes a conveyance belt 118 that is provided in a loop shape for image formation, a support plate 119 that supports the conveyance belt 118 from the back side, and a plurality of belt rollers 120 that are provided on the back side of the conveyance belt 118.

The support unit 117 conveys the paper P downstream by movement of the conveyance belt 118 by the rotation of the belt rollers 120 while the paper P is on outer surface of the conveyance belt 118 during the image formation.

The head units 130 includes liquid ejection heads 1, a plurality of ink tanks 132 for the liquid ejection heads 1, connection channels 133 that connect the liquid ejection heads 1 and the ink tanks 132, and supply pumps 134.

According to the present embodiment, a plurality of head units 130 are provided. The head units 130 use ink of different colors, respectively. For example, as the plurality of head units 130, liquid ejection heads 1 for four colors (cyan, magenta, yellow, and black), and ink tanks 132 that contain ink of these different colors are provided. The ink tanks 132 are connected to the common channel 48 of the liquid ejection head 1 by the connection channel 133.

In addition, negative pressure control devices such as pumps can be connected to the ink tanks 132. The ink supplied to each nozzle 51 forms a meniscus having a predetermined shape by the negative pressure control of the inside of the ink tanks 132 and the water head value of ink being supplied to the liquid ejection heads 1 from the ink tanks 132.

The supply pump 134 is, for example, a liquid feed pump configured as a piezoelectric pump. The supply pump 134 is provided in a supply channel. The supply pump 134 is connected to the control unit 150 by wiring and controlled by the control unit 150. The supply pump 134 supplies liquid to the liquid ejection head 1.

The conveyance device 115 conveys the paper P along the conveyance path A from the medium supply unit 112 to the medium discharge unit 114 via the image forming unit 113. The conveyance device 115 includes a plurality of guide plate pairs 121 arranged along the conveyance path A and a plurality of conveyance rollers 122.

The plurality of guide plate pairs 121 each include a pair of plate members arranged to face each other with the conveyed paper P interposed therebetween and guide the paper P along the conveyance path A.

The conveyance rollers 122 send the paper P downstream along the conveyance path A by being rotated and driven by the control of the control unit 150. Note that sensors for detecting the conveyance state of the paper are arranged at each location along the conveyance path A.

The control unit 150 is, for example, a control substrate. The processor 151, a read only memory (ROM) 152, a random access memory (RAM) 153, an I/O port 154 that is an input and output port, and an image memory 155 are mounted on the control unit 150.

The processor 151 can be a processing circuit such as a central processing unit (CPU) that functions as a controller. The processor 151 controls the head units 130, a drive motor 161, an operation unit 162, various sensors 163, and the like provided in the liquid ejection device 100 via the I/O port 154. The processor 151 transmits the print data stored in the image memory 155 to the drive circuit 70 in the drawing order.

The ROM 152 stores various programs. The RAM 153 temporarily stores various kinds of variable data, image data, and the like. Note that the ROM 152 and the RAM 153 are examples of storage media but other storage media may be used or incorporated as long as the storage media can store various programs or data. The I/O port 154 is an interface unit that receives data from the outside such as an externally connected device 200 and outputs data to the outside. The print data from the externally connected device 200 is transmitted to the control unit 150 via the I/O port 154 and is stored in the image memory 155.

Hereinafter, the ejection waveform and the cancellation waveform of a driving signal are described for the characteristics of a liquid ejection head 1 used in the liquid ejection device 100 according to an embodiment. The ejection waveform and the cancellation waveform may together be described as a drive waveform of the liquid ejection head 1 and/or as non-exclusive components of a drive waveform.

Figure 6:
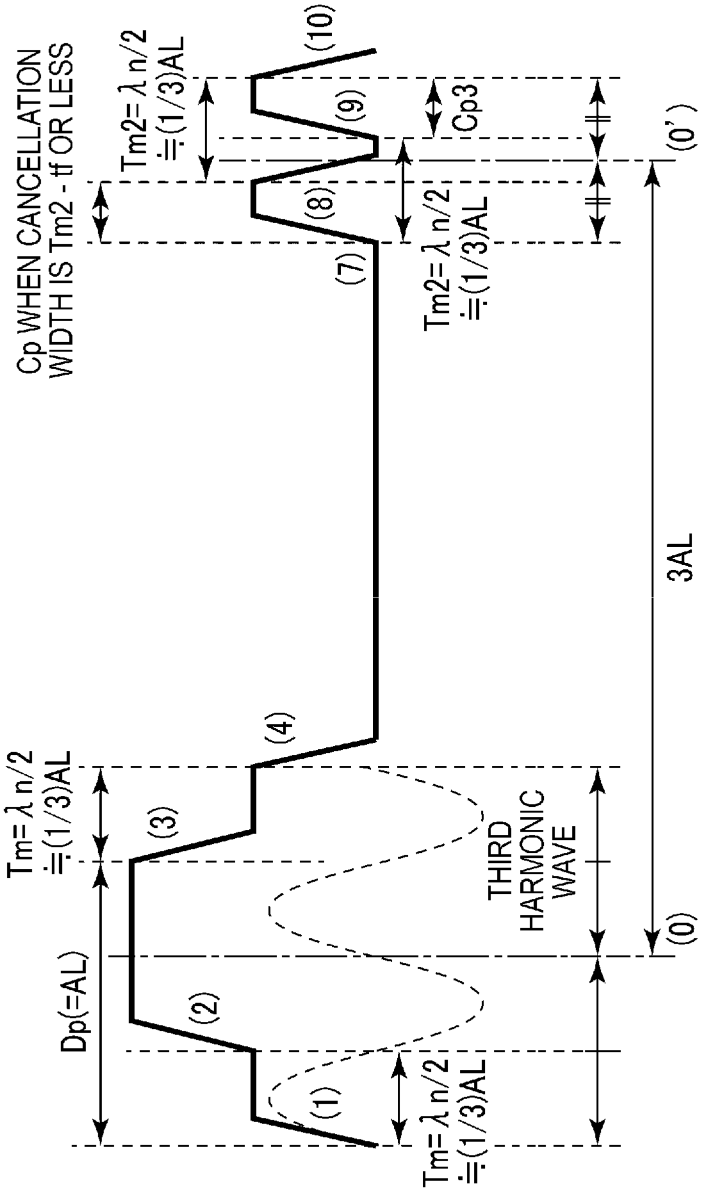
FIG. 6 depicts an example of a drive waveform including a cancellation waveform and an ejection waveform for a liquid ejection head.
Figure 7:
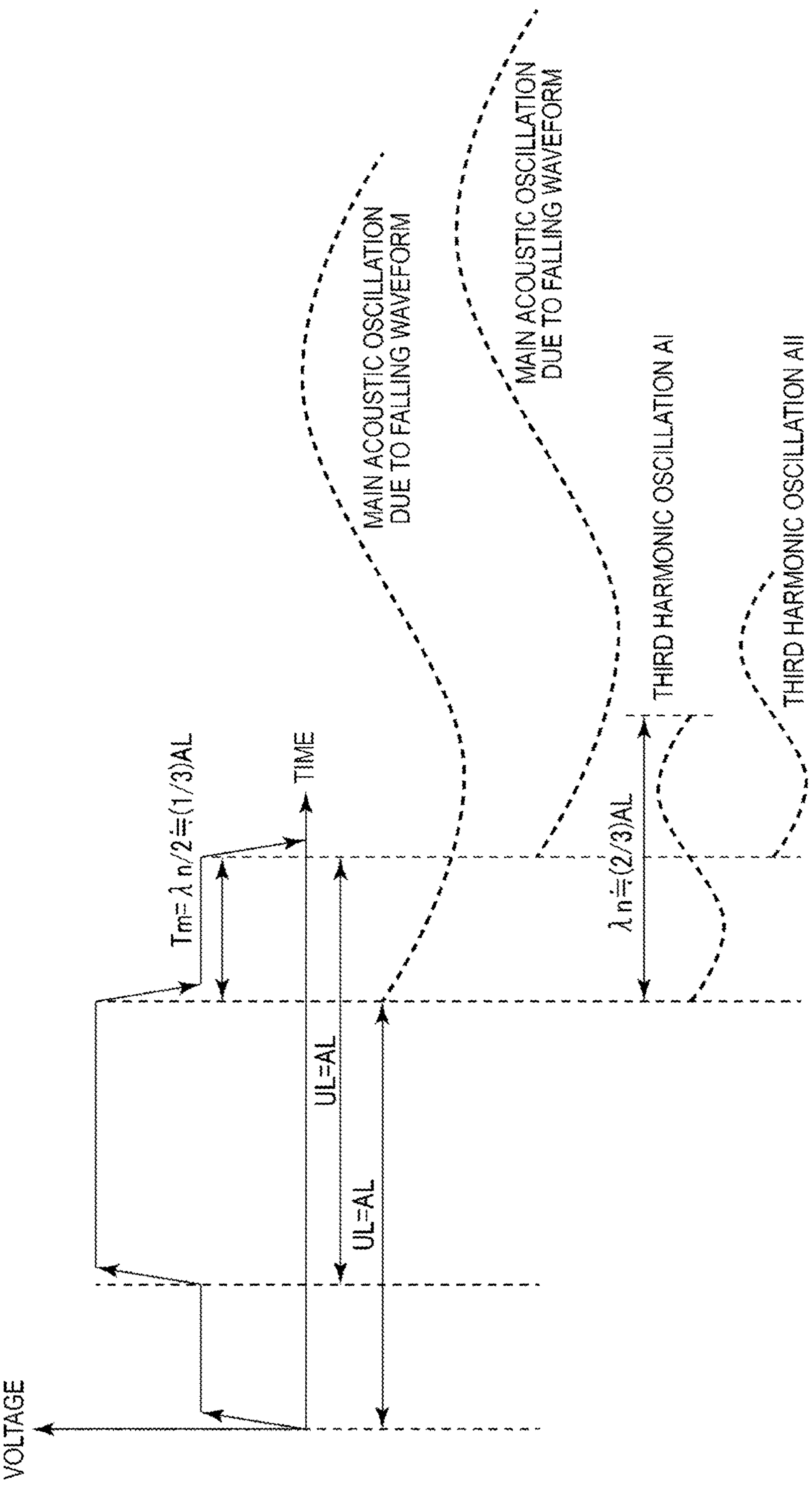
FIG. 7 is an explanatory diagram illustrating aspects of a drive waveform and an acoustic oscillation of a liquid ejection head.
Figure 9A:
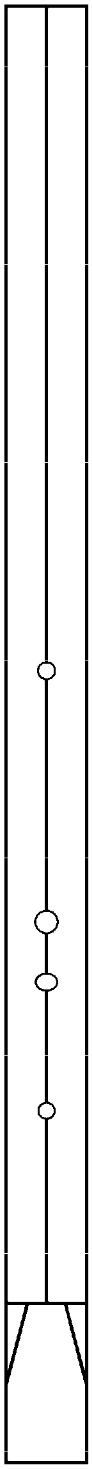
FIGS. 9A to 9C depict an example of an ejected liquid droplet of a liquid ejection head.
Figure 9B:
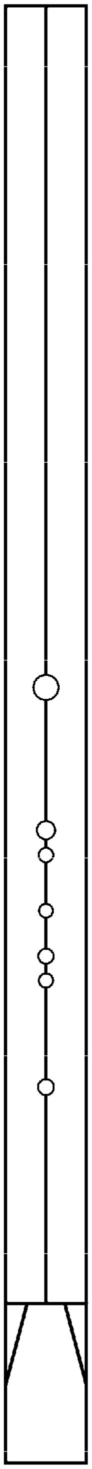
Figure 9C:
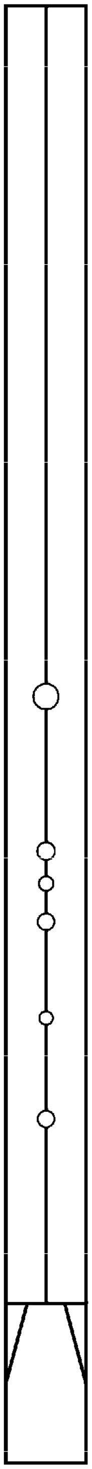
Figure 10:
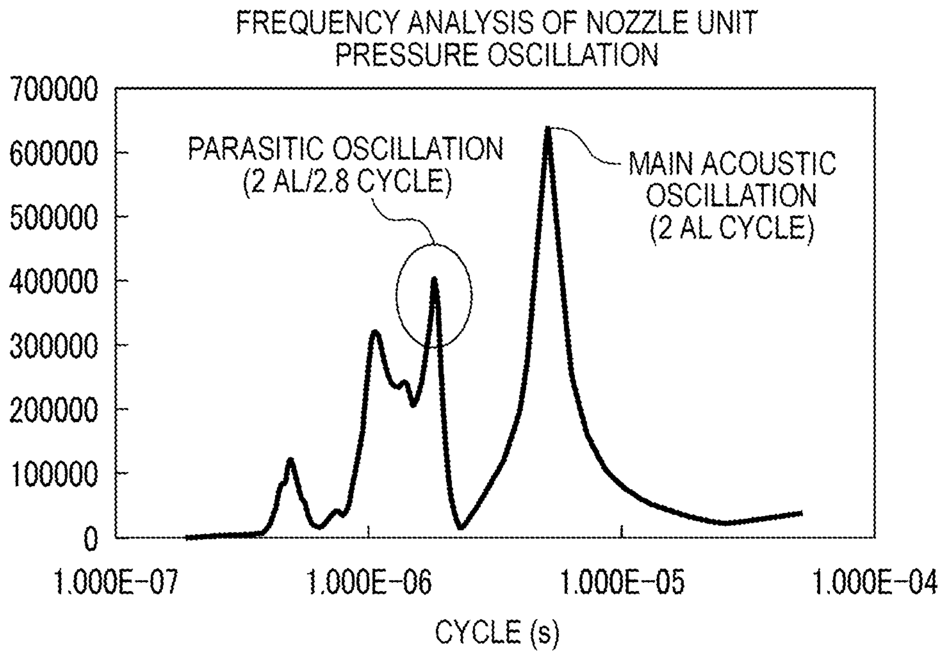
FIG. 10 is an explanatory diagram illustrating an example of frequency analysis of a liquid ejection head according to a comparative example.
Figure 11:
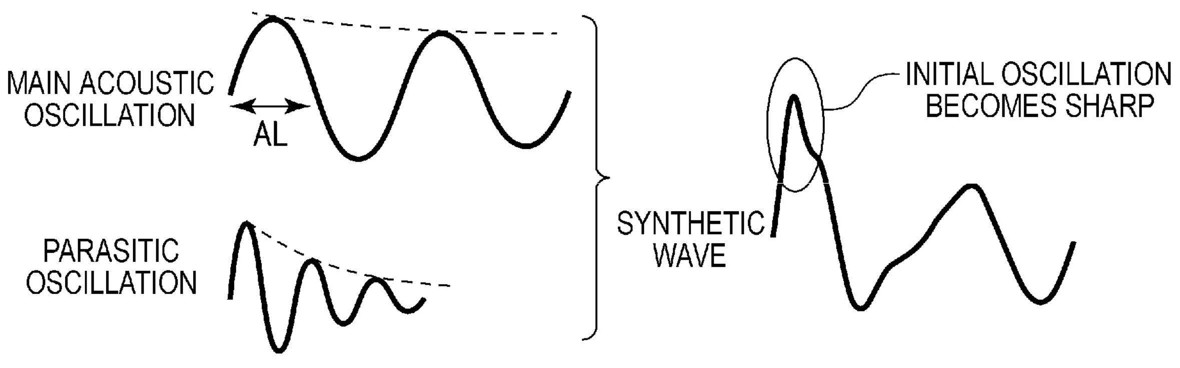
FIG. 11 is an explanatory diagram illustrating aspects of synthesizing main acoustic oscillation and parasitic oscillation of a liquid ejection head.
Figure 12:
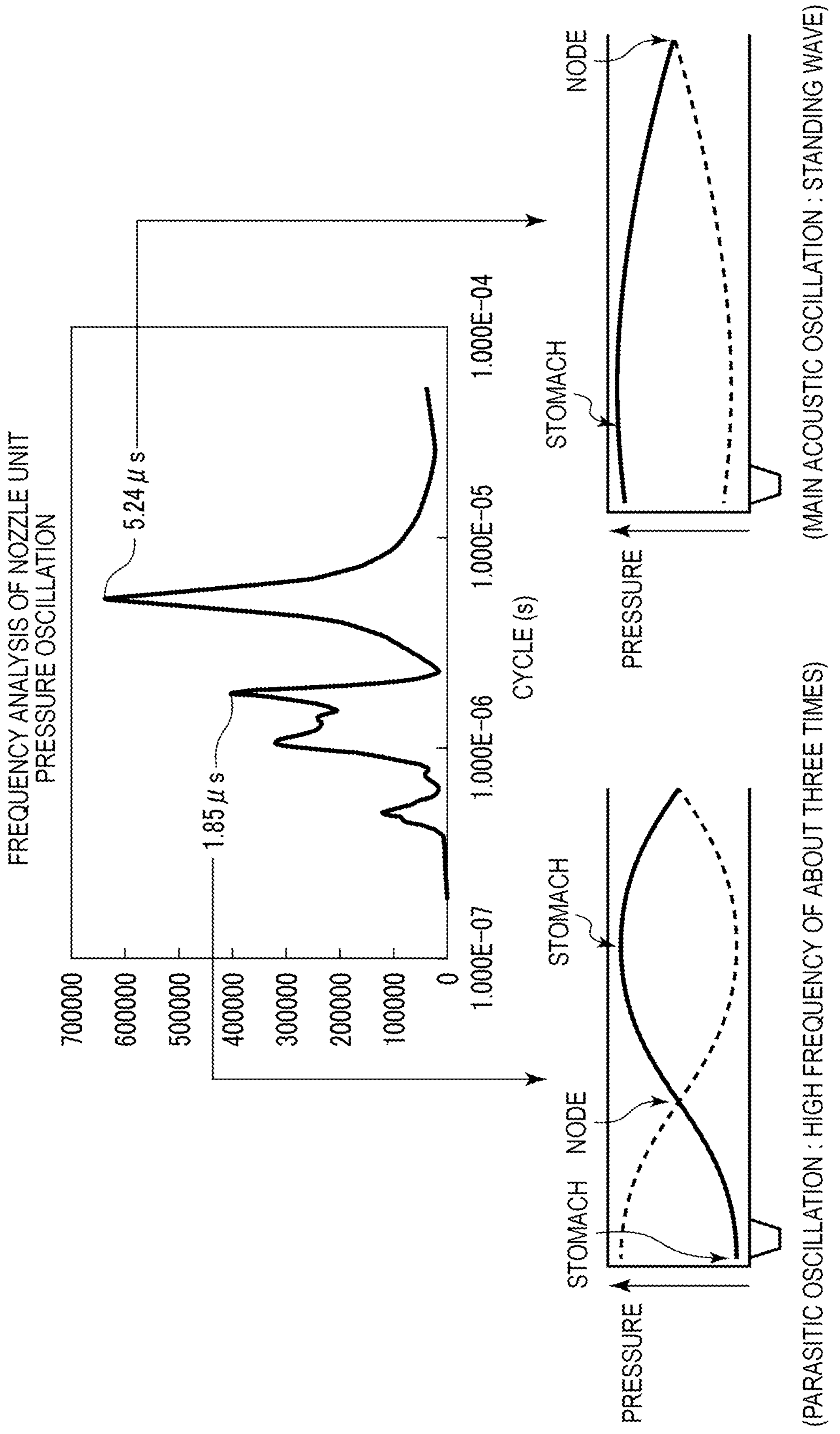
FIG. 12 is an explanatory diagram illustrating aspects of frequency analysis of a liquid ejection head.
Figure 13:
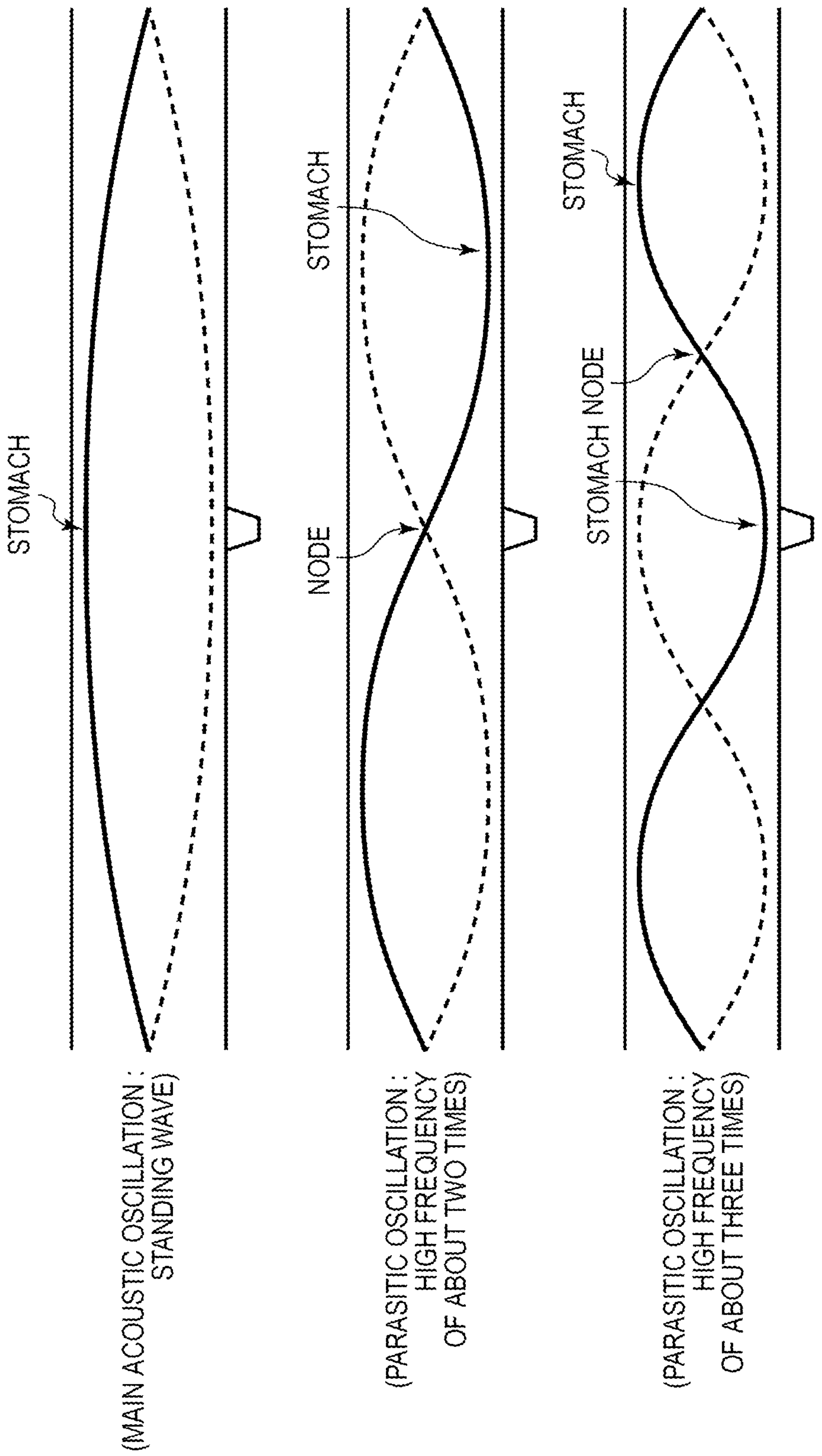
FIG. 13 is an explanatory diagram illustrating aspects of a drive waveform and an acoustic oscillation of a liquid ejection head.
Figure 14:
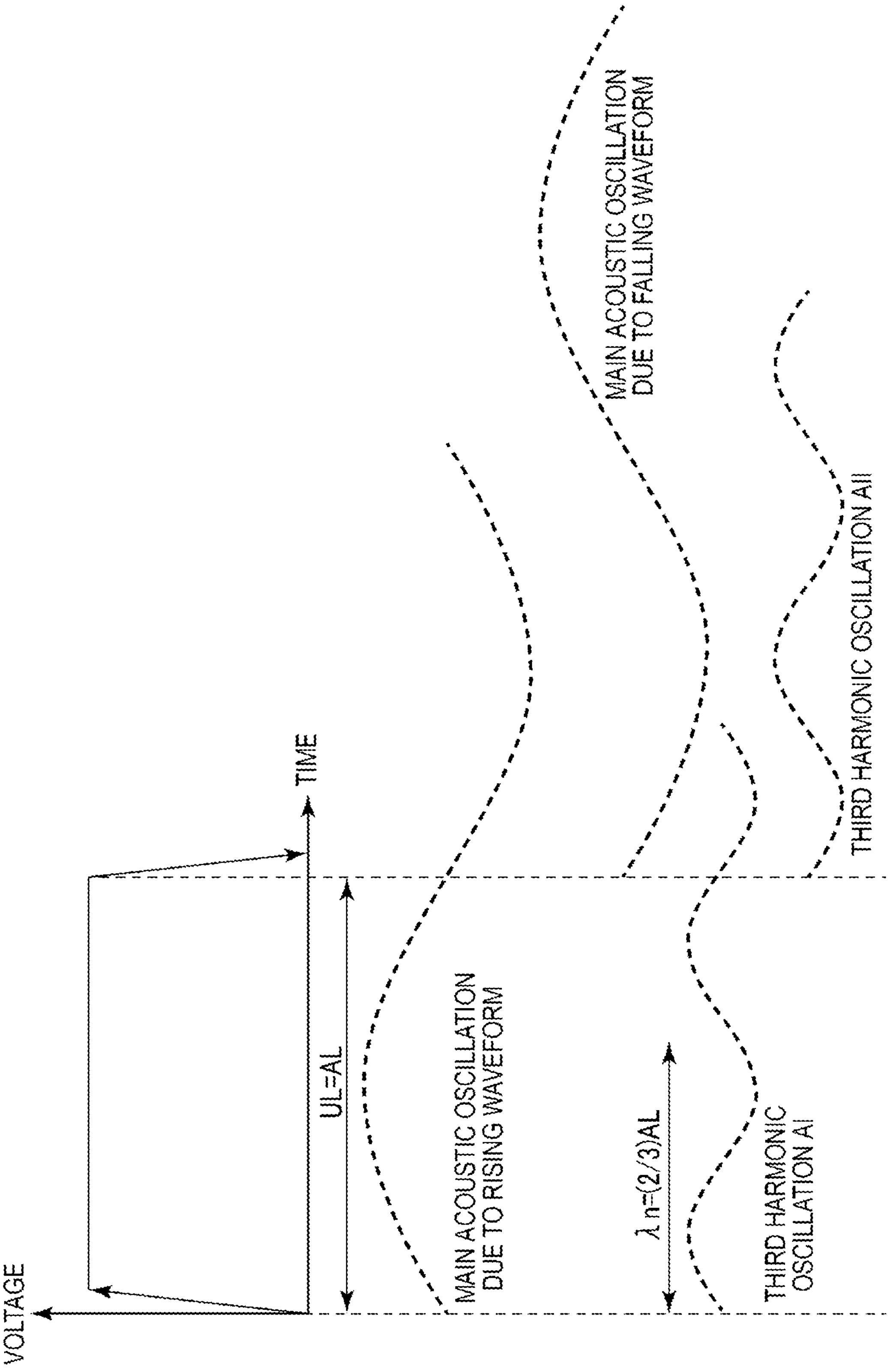
FIG. 14 is an explanatory diagram illustrating aspects of a drive waveform and an acoustic oscillation of a liquid ejection head.

A drive waveform for the liquid ejection head 1 according to the present embodiment is described with reference to FIGS. 6 to 14. Note that FIG. 6 is an explanatory diagram illustrating an example of the drive waveform including the ejection waveform and the cancellation waveform. FIG. 7 is an explanatory diagram illustrating an example of the drive waveform and the acoustic oscillation of the liquid ejection head 1 according to the embodiment, FIG. 8 is an explanatory diagram illustrating the relationship between the drive waveform and the ejected liquid droplet(s) in an example of the liquid ejection head 1, and FIGS. 9A to 9C are an explanatory diagram illustrating an example of the ejected liquid droplet(s) of the liquid ejection head 1 according to the embodiment. FIGS. 10 to 14 are drawings for describing the liquid ejection head in a comparative example. FIG. 10 is an explanatory diagram illustrating an example of frequency analysis of pressure oscillation of a liquid ejection head according to the comparative example. FIG. 11 is an explanatory diagram illustrating an example of synthesizing main acoustic oscillation and parasitic oscillation of FIG. 10. FIG. 12 is an explanatory diagram illustrating an example of the frequency analysis of the liquid ejection head according to the comparative example. FIG. 13 is an explanatory diagram illustrating an example of a drive waveform and the acoustic oscillation of a liquid ejection head according to the comparative example. FIG. 14 is an explanatory diagram illustrating an example of a drive waveform and the acoustic oscillation of a liquid ejection head according to the comparative example.

The liquid ejection head in the comparative example has a driving method that may be referred to as "pulling," or a "pull type" for which the ejection force can be increased by driving the piezoelectric columns 21 in accordance with a half cycle AL of the main acoustic oscillation of the pressure chamber. However, as illustrated in the example of the frequency analysis of the nozzle unit pressure oscillation of FIG. 10, if the liquid ejection head (actuator) is driven to eject the liquid droplet from the nozzle, parasitic oscillation may occur in a frequency region higher than the main acoustic oscillation in the pressure chamber in addition to the main acoustic oscillation by ink fluidic oscillation.

When a droplet is ejected from a nozzle by driving an actuator, if parasitic oscillation with a frequency higher than that of the main acoustic oscillation occurs, the pressure in the pressure chamber has a shorter cycle pressure peak than the half cycle of the main acoustic oscillation, as illustrated in FIG. 11. That is, the synthesized wave obtained by combining the main acoustic oscillation and the parasitic oscillation has a sharp initial oscillation. A pressure peak having a short cycle increases the ejection speed of the leading end portion of the ejected liquid droplet but does not last until the end of the ejection and this lowers the ejection speed of the trailing end portion of the ejected liquid droplet. As illustrated in FIG. 9A, when the droplet is ejected, the volume of the satellite with respect to the leading end liquid droplet increases and this deteriorates print quality. In this context, a satellite is a liquid droplet that is ejected after the first ejected droplet (leading end liquid droplet) with a slight gap from the leading end liquid droplet when liquid is ejected from a nozzle by driving the piezoelectric column 21 and deforming of the pressure chamber.

In the liquid ejection head in the comparative example, as illustrated in the frequency analysis of FIG. 12, in addition to the main acoustic oscillation, parasitic oscillation occurs at about 3 times (for example, 2.8 times) the frequency. Here, the following is considered as the causes of the parasitic oscillation having a frequency higher than that of the main acoustic oscillation in the pressure chamber of the liquid ejection head.

An example of the cause is oscillation of an odd multiple of three or more in the liquid column oscillation of a closed tube, and an example of such a liquid ejection head is an end shooter having a connection point to a common channel as an open end, similarly to the liquid ejection head 1 of the embodiment, as illustrated in FIG. 12.

Another example of the cause is oscillation of an integer multiple of two or more in the liquid column oscillation of the open tube, and an example of such a liquid ejection head is a side shooter having a connection point to a common channel as an open end, as illustrated in FIG. 13. Note that in the main acoustic oscillation of the open tube, the amplitude of the pressure oscillation becomes the greatest in the central portion of the open tube, and thus a nozzle is usually provided near the central portion (middle point) of the open tube. As illustrated in FIG. 13, if oscillation of an even multiple (2 or more) occurs in the liquid column oscillation of the open tube, the central portion of the open tube becomes a node of the oscillation having the small pressure oscillation amplitude. Therefore, if the nozzle is provided near the central portion of the open tube, the shape of the ejected liquid droplet is not likely to receive the full influence of the oscillation of an even multiple. Therefore, if the nozzle is provided near the central portion of the open tube, the oscillation of an odd multiple (3 or more) increases the volume of the satellite more than the oscillation of an even multiple, and thus the print quality is deteriorated more easily.

Another example of the cause is oscillation caused by reflection of the pressure oscillation when the pressure chamber and the individual channel have different channel cross-sectional surfaces.

Also, another example of the cause is oscillation caused because the pressure generated in the pressure chamber is reduced in the channel having a low rigidity when the rigidity of the wall surface or a part of the wall surface of the individual channel is less than the pressure chamber, and a node of the pressure oscillation is generated between the pressure chamber and the channel having low rigidity. This occurs when, for example, the installation range (position) of an actuator (the piezoelectric columns 21) is as illustrated with a two-dot chain line in FIG. 1 as compared to the actuator (piezoelectric column 21) indicated by the solid line in FIG. 1. That is, the position of the piezoelectric column 21 may be mispositioned or misaligned with respect to the position of the diaphragm due to manufacturing errors, tolerances, and the like. Note that, results of the frequency analysis of the pressure oscillation of the nozzle unit if simulation of structural analysis of deformation of PZT or a pressure chamber, compressible fluid analysis of a liquid behavior in the channel, and fluid surface analysis of liquid droplet ejection from the nozzles is performed with respect to the head in a case where the range, which is supported only by the diaphragm and is not supported by the actuator, on the upper right of the pressure chamber of FIG. 1 is a range of about less than 30% of the length of the pressure chamber in the longitudinal direction (the horizontal width of the pressure chamber 46 in FIG. 1) are the graphs illustrated in FIGS. 10 and 12.

Also, as illustrated in FIG. 14, if a rectangular wave width UL of the ejection waveform is AL, third harmonic oscillation AI generated by the pressure chamber expansion (rising waveform) in advance before ejection and third harmonic oscillation AII of the liquid column oscillation by the pressure chamber contraction (falling waveform) during ejection strengthen each other, and thus pressure peaks with a short cycle are generated due to the third harmonic oscillation, thereby causing the deterioration of print quality.

Next, an example of the driving and the drive waveform of the liquid ejection head 1 according to the present embodiment is described. In the present embodiment, the pressure oscillation of the pressure chamber 46 of the liquid ejection head 1 is considered as a liquid column oscillation of a closed tube, an acoustic resonance frequency (parasitic oscillation) in a frequency region higher than the main acoustic resonance frequency (main acoustic oscillation) of the liquid in the pressure chamber 46 is a drive waveform that suppresses third harmonic oscillation of an odd multiple of about three or more of the main acoustic resonance frequency. Here, about three times includes 2.8 times as illustrated in FIG. 10.

When the potential difference is the greatest, the pressure chamber 46 is expanded the greatest amount by the piezoelectric column 21 of the actuator 20. When the potential difference is the smallest, the pressure chamber 46 of the ink is contracted to the smallest size by the piezoelectric columns 21 of the actuator 20. Also, when the ink is to be ejected by the liquid ejection head 1, the pressure chamber 46 is expanded in advance of the ejection, and the ink is then ejected by contracting the pressure chamber 46.

In the example of the present embodiment, the drive waveform voltage is increased at least two times consecutively by an expansion potential difference so the pressure chamber 46 is expanded in advance of ejection, or is reduced at least two times consecutively by a contraction potential difference so the pressure chamber 46 is contracted for ejection. More preferably, the ejection waveform of the drive waveform changes the potential twice consecutively for both the expansion and the contraction of the pressure chamber 46.

After the ejection waveform for ejecting the ink is supplied, the cancellation waveform is supplied to cancel the residual oscillation that is generated after the ejection of the ink. Since the residual oscillation in the pressure chamber 46 is attenuated by channel resistance and the like, the cancellation waveform in the drive waveform uses a single-step rectangular waveform having the same trapezoidal shape (trapezoidal waveform) two times consecutively at a time interval. The cancellation waveform uses rectangular waveforms with the same shape with a waveform width Cp3 and are less than the acoustic length AL, for example. Note that if the viscosity of the ink is high, the attenuation of the residual oscillation is large, and the width of the cancellation waveform can be correspondingly reduced.

FIGS. 6 and 7 illustrate drive waveforms when ink of the liquid ejection head 1 is ejected. In FIGS. 6 and 7, the vertical axis is the voltage (potential difference), and the horizontal axis is time. Note that the drive waveform is generated by the driver IC 72 of the drive circuit 70. As illustrated in FIG. 6, in the ejection waveform, the drive waveform increases the potential difference in two steps and reduces the potential difference in two steps. The stages (1), (2), (3), (4) in the ejection waveform may be equally spaced in time. The stages (7), (8), (9), (10) need not be equally spaced in time from each other.

An example of the ejection waveform is specifically described with reference to FIG. 7. As illustrated in FIG. 7, the potential difference is increased two times consecutively from the expansion start by the expansion potential difference and the time interval until the time of the contraction start is set as UL. In addition, as illustrated in FIG. 7, the time interval from the time of the second expansion potential change at the second time until the start of the second contraction is also set as UL. Note that in FIG. 6 and the following description, the time interval UL from the time of the expansion start until the time of the contraction start may be described as the time Dp (see FIG. 6).

As illustrated in FIG. 7, the drive waveform that ejects the ink from the nozzle 51 deforms the pressure chamber 46 and changes the potential difference two times consecutively in the same direction during both expansion and contraction of the pressure chamber 46. Also, in the drive waveform, the time interval from the start of the expansion of the pressure chamber 46 until the contraction of the pressure chamber 46 begins and the time interval from the start of the second consecutive expansion until the start of the second consecutive contraction are both set to UL. The time interval UL is greater than 0.5 AL but less than 1.5 AL. More preferably, UL=AL. When UL is set to be greater than 0.5 AL but less than 1.5 AL, the main acoustic oscillation generated by the expansion of the pressure chamber 46 in advance before ejection and the main acoustic oscillation generated by the contraction of the pressure chamber 46 during ejection strengthen (reinforce) each other.

Here, if the cycle of the parasitic oscillation such as the third harmonic wave is set as $\lambda n$, and the time interval between the first potential difference change start time and the second potential difference change start time is set as Tm, the drive waveform satisfies $Tm=\lambda n/2$. If the piezoelectric column 21 (actuator) is driven by such a drive waveform, as illustrated in FIG. 7, the phase difference between the parasitic oscillation generated when the potential difference is changed at the first time and the parasitic oscillation generated when the potential difference is changed at the second time will be 180 degrees, and the parasitic oscillations cancel each other out. Therefore, the deterioration of the print quality can be suppressed.

As illustrated in FIG. 7, the drive waveform may preferably have the potential difference changes for the first and second changes (steps) be the same. Therefore, the residual oscillation derived from the parasitic oscillation thereafter can be better suppressed.

If the time interval UL of the ejection waveform is set as AL, and a time interval Tm is set as λn/2, as illustrated in FIG. 7, the phase difference between the parasitic oscillation generated by the pressure chamber contraction (falling waveform) when the potential difference at the first time is changed (the third harmonic oscillation AI) and the parasitic oscillation generated by the pressure chamber contraction (falling waveform) when the potential difference at the second time is changed (the third harmonic oscillation AII) will be 180 degrees, and the parasitic oscillations cancel each other out. Further, by causing the time interval Tm to be λn/2, the phase difference between the parasitic oscillation generated by the pressure chamber expansion (rising waveform) when the potential difference at the first time is changed (the third harmonic oscillation AI) and the parasitic oscillation generated by the pressure chamber expansion (rising waveform) when the potential difference at the second time is changed (the third harmonic oscillation AII) becomes 180 degrees, and the parasitic oscillations cancel each other out. In addition, by setting UL to be AL, the main acoustic oscillation generated by the pressure chamber expansion (rising waveform) before ejection and the main acoustic oscillation generated by the pressure chamber contraction during ejection (falling waveform) reinforce each other to increase the ejection force generated by the main acoustic oscillation. The pressure chamber can be expanded in two steps (stages) so that the total voltage change is not applied immediately. Similarly, the pressure chamber can be contracted in two steps (stages) for ejection so that the total voltage change is not applied immediately.

Here, in the example drive waveform, the value of Tm for which the parasitic oscillations of the cycle λn weakens each other is described. The oscillation of the cycle λn generated when the potential difference at the first time is changed is set as A, and an oscillation vector of A after the period of time Tm is set as A'. An oscillation vector of the cycle λn generated when the potential difference at the second time is changed is set as B. The absolute value of the composite vector of A' and B when Tm is an odd multiple of λn/2 (the phase difference between A' and B is 180 degrees) is minimized. If the absolute value of the composite vector of A' and B from an expression for synthesizing the simple harmonic motion of the cycle λn is equal to or less than the larger of the absolute values of A' and B (if the absolute value of A' and the absolute value of B are the same value, equal to or less than the value) is obtained, the phase difference between the oscillation vectors A' and B may be within +60 degrees of 180 degrees.

The absolute value of the composite vector of A' and B can be represented by the following expression, in which θA is a phase of A' and θB is a phase of B:

(Numerical Expression 1)

$$\sqrt{(|A'|^{\wedge}2+|B|^{\wedge}2+2*|A'|*|B|*\cos(\theta A-\theta B))}.$$

Here, if |A'|≤|B|, the phase difference between A' and B (θA−θB) in which |B|≥Numerical Expression 1 is satisfied becomes the condition in which the oscillations of the cycle λn weakens each other. If |B|≥Numerical Expression 1 is manipulated by squaring both sides, the following results:

(Numerical Expression 2)

$$0 \geq |A'| + 2*|B|*\cos(\theta A-\theta B).$$

From the above, if the phase difference between A' and B (θA−θB) is within +60 degrees of 180 degrees, Numerical Expression 2 is satisfied.

Also, when |B|≤|A'|, if |A'|≥Numerical Expression 1 is manipulated by squaring both sides, the following results:

(Numerical Expression 3)

$$0 \geq |B| + 2*|A'|*\cos(\theta A-\theta B).$$

the phase difference between A' and B (θA−θB) is within +60 degrees of 180 degrees, Numerical Expression 3 is satisfied.

From these, the condition in which the parasitic oscillations of the cycle λn weakens each other is represented in the following:

(Numerical Expression 4)

$$(k/2-1/6)\lambda n \leq Tm \leq (k/2+1/6)\lambda n.$$

Here, k is an odd number of 1 or more.

If the potential difference is changed in two consecutive stages during both the expansion and contraction of the pressure chamber 46, Tm of the drive waveform is preferably (k/2−⅙)λn≤Tm≤(k/2+⅙)λn (where k is an odd number of 1 or more) for both the intermediate potential difference holding time during the pressure chamber expansion and the intermediate potential difference holding time during the pressure chamber contraction.

In addition, in view of reduction of power consumption by causing the main acoustic oscillations to strengthen each other, Tm is preferably short.

For this, if the reduction of power consumption is considered, Tm of the drive waveform may be represented by the following:

(Numerical Expression 5)

$$(k/2-1/6)\lambda n \leq Tm \leq k\lambda n/2.$$

Here, k is an odd number of 1 or more.

Next, as an evaluation of the drive waveform of the liquid ejection head 1 according to the present embodiment, FIG. 8 illustrates results in a case where the liquid ejection head 1 having a 2 AL value equal to 5.24 μs is driven by various waveforms for the nominal ejection of one ink drop. Note that the voltage is adjusted so that the leading drop speed becomes approximately 8 m/s for all the various waveforms in FIG. 8.

The first drive waveform in FIG. 8 is, as a comparative example, set to a drive waveform having the trapezoidal shape illustrated in FIG. 14 for which the rise time tr is 0.2 μs, the others table entries are set to drive waveforms that change the potential difference in two stages as illustrated in FIG. 7, Tm is varied as indicated, but all rise times are set to 0.2 μs. Also, the "ejection voltage" column value indicates the difference between the expansion potential difference and the contraction potential difference. Note that the intermediate potential difference is an intermediate (e.g., mid-point) value of the total expansion potential difference and the total contraction potential difference.

In a liquid ejection head 1 of the embodiment and a liquid ejection head of the comparative example, as indicated by the frequency analysis of FIG. 12, parasitic oscillation of about three times occurs in addition to the main acoustic oscillation. The cycle λn of the parasitic oscillation is 1.85 μs, and λn/2 becomes 0.925 μs.

In FIGS. 9A to 9C, one drop of ink is to be ejected, and the result obtained by simulating the state of the ejected liquid droplet is indicated. FIG. 9A illustrates an example showing the ejected liquid droplet for the drive waveform having a trapezoidal shape according to the comparative example in which tr=0.2 μs. FIG. 9B illustrates an example showing the ejected liquid droplet for the drive waveform in which the potential difference is changed in two stages and Tm=0.62 μs. FIG. 9C illustrates an example showing the ejected liquid droplet for the drive waveform in which the potential difference is changed in two stages times and Tm=0.93 μs.

As illustrated in FIG. 8 and FIG. 9C, in the waveform for which Tm=0.93 μs that is the closest to the half cycle of the parasitic oscillation has the largest ratio of the leading drop volume to the total ejection volume, and it can be understood that the ratio of the leading drop volume becomes smaller, as Tm is gets farther from 0.925 μs as illustrated in FIG. 8 and FIG. 9B. Also, it can be understood that, as Tm gets smaller, the ejection voltage per unit volume (ejection voltage/total ejection volume) tends to be lower. From these results, the drive waveform of the liquid ejection head 1 according to the embodiment can suppress the oscillation having the frequency higher than the main acoustic oscillation, while suppressing the power consumption.

Next, an example of the cancellation waveform is specifically described with reference to FIG. 6. Note that for convenience of explanation, in FIG. 6, the following description of the first to fourth potential difference changes in the ejection waveform are labeled as (1) to (4), and the potential difference changes in the cancellation waveform are labeled as (7) to (10). The potential difference changes (7) and (8) of the cancellation waveform form a first trapezoidal waveform in the cancellation waveform, and the potential difference changes (9) and (10) form a second trapezoidal waveform in the cancellation waveform. The reference point for the phase of the ejection waveform is labeled as (0), and the reference point of the phase of the cancellation waveform is labeled as (0'). Note that, here, the reference point (0) is between points (2) and (3), and the reference point (0') is between (8) and (9). Also, in the example of FIG. 6, the voltage falling time tf is set to be substantially the same as the voltage rising time tr. Also, value Tm of the cancellation waveform is set as Tm2. In addition, for convenience of explanation, all the potential difference changes from (1) to (4) are assumed to be substantially the same in magnitude, and attenuation of the oscillation due to fluid resistance is assumed to be small and will be ignored in the following description.

First, the main acoustic oscillation of the ejection waveform is illustrated. In the ejection waveform, when the potential difference is changed, and the intermediate voltage for expanding the pressure chamber 46 as illustrated at point (1) is input, the pressure chamber 46 is expanded, and the pressure in the pressure chamber 46 is reduced. The oscillation caused by this becomes an oscillation for which the phase is advanced by −π+(Dp+Tm)/2. When the potential difference is changed as illustrated at point (2), the oscillation becomes an oscillation for which the phase is advanced by −π+(Dp−Tm)/2. The synthesized wave of (1) and (2) becomes an oscillation for which the phase is advanced by −π+Dp/2.

Potential differences in at points (3) and (4) for contracting the pressure chamber 46 are changed in an opposite way as at points (1) and (2), the pressure chamber 46 is contracted, and the pressure chamber 46 is pressurized (pressure in the pressure chamber 46 is increased). Therefore, the change at point (3) causes an oscillation for which the phase is advanced by −(Dp−Tm)/2. Also, the change at point (4) causes an oscillation for which the phase is advanced by −(Dp+Tm)/2. Therefore, the synthesized wave of from changes at points (3) and (4) becomes an oscillation for which the phase is advanced by −Dp/2.

Here, for the synthesized wave for changes at points (1), (2), (3), and (4) at the time point of (0), the oscillation has a phase which is advanced by −π/2.

Next, the main acoustic oscillation of a cancellation waveform is illustrated. In the first trapezoidal waveform of the cancellation waveform, when the first potential difference change is performed for expanding the pressure chamber 46 as illustrated at point (7), the pressure chamber 46 is expanded, and the pressure in the pressure chamber 46 is reduced. Therefore, the oscillation resulting by from input of the potential difference illustrated at point (7) becomes an oscillation for which the phase is advanced by −π+(Tm2+Cp3)/2.

In the first trapezoidal waveform of the cancellation waveform, the potential difference at point (8) for contracting the pressure chamber 46 is changed in an opposite direction from point (7). Therefore, when the potential difference shown for point (8) is input, the pressure chamber 46 is contracted, and the pressure chamber 46 is pressurized. Therefore, the oscillation occurring by the input of the potential difference shown for point (8) becomes an oscillation for which the phase is advanced by (Tm2−Cp3)/2. The synthesized wave of the changes at points (7) and (8) becomes an oscillation for which the phase is advanced by −π/2+Tm2/2.

In the second trapezoidal waveform of the cancellation waveform, the potential difference at point (9) is input, the pressure chamber 46 is expanded, and the pressure in the pressure chamber 46 is reduced. Therefore, the oscillation resulting by the change in potential difference at point (9) becomes an oscillation for which the phase is advanced by −π−(Tm2−Cp3)/2.

In the second trapezoidal waveform of the cancellation waveform, the potential difference change for contracting the pressure chamber 46, at point (10) is changed in an opposite direction from the change at point (9). When the potential difference shown for point (10) is input, the pressure chamber 46 is contracted, the inside of the pressure chamber 46 is pressurized. Therefore, the oscillation resulting from the input of the potential difference at point (10) becomes an oscillation for which the phase is advanced by −(Tm2+Cp3)/2. The synthesized wave of the changes at points (9) and (10) becomes an oscillation for which the phase is advanced by −π/2−Tm2/2.

For the synthesized wave of changes from points (7), (8), (9), and (10) at the time point of (0') the oscillation has a phase that is advanced by −π/2.

Therefore, if the time difference (time interval) between (0) and (0') is set to be an odd multiple of π/2(AL), the phase of the synthesized wave for points (1), (2), (3), and (4) and the phase of the synthesized wave for points (7), (8), (9), and (10) will be opposite to each other and weaken each other. Also, the amplitude of the synthesized wave for points (7), (8), (9), and (10) (cancellation waveform) can be adjusted by setting a time width Cp3 between points (7) and (8) and the time width Cp3 between points (9) and (10) to be identical to each other and keeping the time width to be equal to or less than Tm−tr. Therefore, by the setting of the time width Cp3, the residual oscillation of the synthesized wave resulting from points (1), (2), (3), and (4) can be cancelled out by the synthesized wave resulting from points (7), (8), (9), and (10).

The residual oscillation of the synthesized wave from points (1), (2), (3), and (4) can be cancelled out by causing the time difference between points (0) and (0') to be 1 AL. However, if the time difference between points (0) and (0') is 1 AL, the residual oscillation will be cancelled out during the liquid droplet ejection, and thus the ejection force of the liquid droplet will be weakened. Therefore, it is preferable that the time difference between points (0) and (0') be an odd multiple of AL of three or more.

Also, since the time interval between (7) and (9) is Tm2, and the time interval between (8) and (10) is also Tm2, if Tm2 is caused to be a half of the cycle λn of the parasitic oscillation, the parasitic oscillation between (7) and (9) cancels each other out, and the parasitic oscillation of (8) and (10) cancels each other out.

As above, by setting the cancellation waveform having a repeated trapezoidal wave (or a single-step rectangular wave repeated twice) with the Cp3 width at the time interval of Tm2 for a stair-like ejection waveform having a plurality of steps as described above, both the residual oscillation of the main acoustic oscillation caused by the ejection waveform and the parasitic oscillation caused by the cancellation waveform can be suppressed. Therefore, it is possible to prevent the liquid droplet being ejected by the next ejection waveform input after the cancellation waveform has been input from receiving influence of the residual oscillation or the parasitic oscillation.

Figure 15:
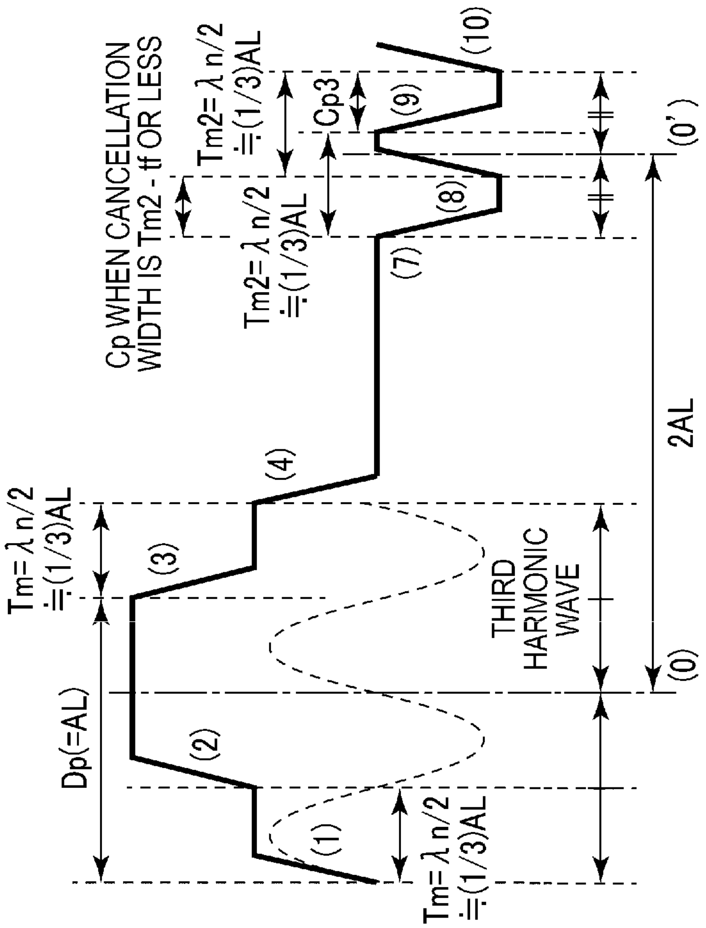
FIG. 15 depicts an example of a drive waveform and a cancellation waveform according to another embodiment.

Note that the potential difference of the cancellation waveform may be changed to have a polarity different from the ejection waveform with respect to the ground voltage, for example, the negative polarity. For example, FIG. 15 illustrates an example of the cancellation waveform with the potential difference changed to a negative polarity according to another embodiment. The example illustrated in FIG. 15 depicts a cancellation waveform in which the pressure chamber is contracted by a potential difference change with a negative polarity for points (7) and (9), and the pressure chamber returns with the potential difference change for points (8) and (10). In such a cancellation waveform, the potential from point (7) to (8) and the potential from point (9) to (10) become the lowest potential used in the drive waveforms. Also, in the example of FIG. 15, in the ejection waveform and the cancellation waveform, there are three potential differences having the potential higher than the ground voltage. Therefore, when such a cancellation waveform is used, for example, the drive circuit 70 may be connected to a fourth voltage source (similar to the first through third voltage sources 81, 82, 83) in addition to the first voltage source 81, the second voltage source 82, and the third voltage source 83. Such a drive circuit 70 may be configured to connect any one of the first voltage source 81, the second voltage source 82, the third voltage source 83, and the fourth voltage source to the wiring electrode 727 by the control of the voltage control unit 724.

Further, if the pressure chamber is expanded in a case where the voltage (potential difference) is reduced, the voltage (potential difference) is increased in order to contract the pressure chamber in advance before the ejection waveform input. The pressure chamber is expanded in two steps (stages) by reducing the voltage (potential difference) in two steps by the ejection waveform input, and the pressure chamber is contracted by increasing the voltage (potential difference) in two steps at the time of contracting the pressure chamber 46 during ejection. In addition, in the cancellation waveform, the drive waveform contracts the pressure chamber by increasing the voltage (potential difference) in one step, then expands the pressure chamber by reducing the voltage (potential difference) in one step, further contracts the pressure chamber by increasing the voltage (potential difference) in one step, and expands the pressure chamber by reducing the voltage (potential difference) in one step. In this case, since the potential after the voltage (potential difference) is reduced in two steps for pressure chamber expansion in the ejection waveform and immediately before the pressure chamber contraction starts becomes the lowest potential in the drive waveform, the potential is set as the ground voltage, and the other potentials have potentials higher than the ground voltage.

Also in the cancellation waveform of the example of FIG. 15, main acoustic oscillation is described below by using the reference point of the phase between points (8) and (9) of the cancellation waveform as (0'). Assuming a synthesized wave for points (7), (8), (9), and (10) at the time point of (0'), the polarity becomes opposite to that of the cancellation waveform of the example of FIG. 6, and thus the synthesis of points (7), (8), (9), and (10) becomes oscillation of which the phase is advanced by π/2.

Therefore, if the time difference between (0) and (0') is set as the even multiple of π/2 (AL), for example, 2 AL, the phase of the synthesized wave of (1), (2), (3), and (4) becomes opposite to that of the synthesized wave of (7), (8), (9), and (10), and the resulting synthesized waves weaken each other. In addition, the time width Cp3 between points (7) and (8) and the time width Cp3 between points (9) and (10) can be caused to be identical to each other and be equal to or less than Tm−tr, so that the amplitude of synthesized wave (cancellation waveform) of points (7), (8), (9), and (10) can be adjusted. Therefore, by the setting of the time width Cp3, the residual oscillation by the synthesized wave of points (1), (2), (3), and (4) can be cancelled out by the synthesized wave of points (7), (8), (9), and (10).

With the above, by setting the time difference between (0) and (0') to be 2 AL, the residual oscillation resulting from the synthesized wave of points (1), (2), (3), and (4) can be cancelled. Note that the time difference between (0) and (0') may be set as any even multiple of AL.

Since the time interval between points (7) and (9) is Tm2, and also the time interval between points (8) and (10) is Tm2, if Tm2 is set as a half of the cycle λn of the parasitic oscillation, the parasitic oscillations.

With the above, cancellation waveform, both the residual oscillation of the main acoustic oscillation caused by the ejection waveform and the parasitic oscillation caused by the cancellation waveform can be suppressed. Therefore, a liquid droplet ejected by the next ejection waveform that is input after the cancellation waveform has been input can be prevented from receiving the influence of the residual oscillation or parasitic oscillation from the previous ejection.

Next, the condition of Tm in which the parasitic oscillation of the cycle λn weakens each other is described. Here, in the cancellation waveform, in the first trapezoidal waveform, that is, the waveform of points (7) and (8), the oscillation vector of the cycle λn generated during the potential difference change for point (8) is denoted by A0708, and the oscillation vector after the period of time Tm2 of A0708 is denoted by A0708'. In the cancellation waveform, in the second trapezoidal waveform, that is, the waveform of (9) and (10), the oscillation vector of the cycle λn that is generated during the potential difference change of (10) is denoted by A0910. Since the waveform of (7) and (8) and the waveform of (9) and (10) are the trapezoidal waveform of the waveform width Cp3, the absolute value of the composite vector of A0708' and A0910 if Tm2 is an odd multiple of a half of λn (the phase difference between A0708' and A0910 is 180 degrees) becomes minimum. If the condition in which absolute value of the composite vectors of A0708' and A0910 is equal to or less than the larger of the absolute values of A0708' and A0910 (if the absolute value of A0708' and the absolute value of A0910 is the same value, equal to or less than the value) is obtained from an expression of synthesizing the simple harmonic motion of the cycle λn, the phase difference between oscillation vectors A0708' and A0910 is within 180 degrees±60 degrees.

Therefore, the condition in which oscillation of the cycle λn weakens each other is:

(Numerical Expression 6)

$$(kkk/2-1/6)\ \lambda n \leq Tm2 \leq (kkk/2+1/6)\ \lambda n.$$

Here, kkk is an odd number of 1 or more.

Therefore, by setting Tm2 in the above condition, it is possible to prevent the next liquid droplet that is ejected after the cancellation waveform from receiving the influence of the residual oscillation by the parasitic oscillation.

Further, for the sake of simplicity, the cancellation waveform is set as a trapezoidal wave with the waveform width Cp3 repeated two times consecutively. However, even if the waveform has another arbitrary shape, if the cancellation waveform is input two times at the time interval Tm2, the parasitic oscillation due to the waveform in the arbitrary shape cancel each other out, and thus the generation of the parasitic oscillation can be suppressed.

Note that, with respect to the main acoustic oscillation, the time interval of (0) and (0') if the residual oscillation of the ejection waveform is cancelled by the cancellation waveform is set as 3 AL in the example of FIG. 6. However, if the pressure is reduced first, and then pressurization is performed in the cancellation waveform ((7), (8), (9), and (10)) as in the ejection waveform ((1), (2), (3), and (4)), if the condition in which oscillation having the cycle of 2 AL weakens each other in the synthesized wave of (1), (2), (3), and (4) and synthesized wave of (7), (8), (9), and (10) is obtained similarly as in the case of the cycle λn from the expression of the synthesis of the simple harmonic motion, the phase difference between the synthesized wave of (1), (2), (3), and (4) and the synthesized wave of (7), (8), (9), and (10) becomes within 180 degrees±60 degrees. That is, the relationship:

$$(kkkk/2-1/6)\ 2\ AL \leq \text{time interval of (0) to (0')} \leq (kkkk/2+1/6)\ 2\ AL$$

is satisfied, and kkkk here is an odd number of 1 or more.

Also, in the example of FIG. 15, the time interval of (0) to (0') is set as 2 AL. However, since the pressurization is performed first, and then the pressure is reduced in the cancellation waveform, if the condition in which the oscillation having the cycle of 2 AL weakens each other for the synthesized wave of (1), (2), (3), and (4) and the synthesized wave of (7), (8), (9), and (10) is obtained as in the case of the cycle λn from the expression of the synthesis of the simple harmonic motion, the phase difference between the synthesized wave of (1), (2), (3), and (4) and the synthesized wave of (7), (8), (9), and (10) will be within 180 degrees±60 degrees. That is, the relationship:

$$(kkkk-1/6)\ 2\ AL \leq \text{time interval of (0) to (0')} \leq (kkkk+1/6)\ 2\ AL$$

is satisfied, and kkkk is an integer of 1 or more.

In the example of FIG. 6, the residual oscillation from the ejection waveform can be cancelled by the cancellation waveform by adjusting the time interval between (0) and (0') as in the above, in each case of the cancellation waveform in which the pressure is reduced first, and then the pressurization is performed similarly to the ejection waveform and the cancellation waveform in which the pressurization is performed first and then the pressure is reduced on the contrary to the ejection waveform of FIG. 15.

By the liquid ejection head 1 according to the embodiment described above, the residual oscillation of the ejection waveform can be suppressed by the cancellation waveform.

Note that, the embodiment is not limited to the examples described above. In the example described above, a configuration in which the drive waveform used in the liquid ejection head 1 includes one intermediate potential stage is described, but the embodiment is not limited thereto. The drive waveform may have one or more intermediate potential stages.

Hereinafter, as another embodiment, the drive waveform of the liquid ejection head 1 for which the potential difference (expansion potential difference) of the drive waveform of the drive circuit 70 is increased h times (two or more times) consecutively is described with reference to FIGS. 16 and 17.

In the ejection waveform according to the present embodiment, if one of the first to h−1-th potential difference changes is set as the i-th potential difference change, one of the i+1-th to h-th potential difference changes is set as the j-th potential difference change, and the time interval of the i-th and the j-th potential difference change start time is set as Tij, the time intervals Tij are:

(Numerical Expression 7)

$$(k/2-1/6)\,\lambda n \leq Tij \leq (k/2+1/6)\,\lambda n.$$

Here, k is an odd number of 1 or more.

For an ejection waveform that satisfies Numerical Expression 7, the parasitic oscillation of the cycle λn that occurs by two or more times of the corresponding potential difference change weakens each other, and the parasitic oscillation of the cycle λn that occurs in the pressure chamber can be suppressed. This is applied in the same manner to a case where the number of times of the contraction and change of the pressure chamber 46 is h times of three or more times.

Also, when i+1=j, that is, when Tij is a time interval of the consecutive potential difference changes, if the reduction in the power consumption is considered, the time interval Tij is desirably:

(Numerical Expression 8)

$$(k/2-1/6)\lambda n \leq Tij \leq k\lambda n/2.$$

Here, k is again an odd number of 1 or more.

Also, in each of the first to h-th potential difference changes, if the time interval Tij satisfies $(k/2-1/6)\lambda n \leq Tij \leq (k/2+1/6)\lambda n$, or there is another potential difference change that satisfies $(k/2-1/6)\lambda n \leq Tij \leq k\lambda n/2$, the ejection waveform can further suppress the parasitic oscillation of the cycle λn occurring in the pressure chamber 46.

Also, by causing the potential difference change amounts of the i-th and j-th potential difference changes at the time intervals Tij satisfying $(k/2-1/6)\lambda n \leq Tij \leq (k/2+1/6)\lambda n$ to be the same, the residual oscillation derived from the parasitic oscillation can be further suppressed. More preferably, since the optimum holding time of each step when the potential differences of the steps are the same, and the pressure oscillation is not attenuated is λn/the number of steps (h), the time interval Tij of all the consecutive potential difference changes may be λn/the number of steps (h).

Also, for reducing the power consumption by causing the main acoustic oscillation to strengthen each other, in the ejection waveform, if the number of times of the potential difference change that consecutively expands and changes the pressure chamber is h times of two times or more, the time interval Tij between the first potential difference change and the h-th time of potential difference change is desirably within 0.5 times of the main acoustic oscillation cycle. This is because, if the time interval Tij of the first potential difference change and the h-th potential difference change is within 0.5 times of the main acoustic oscillation cycle, the main acoustic oscillation occurring due to all the first to h-th potential difference changes strengthens each other, and contributes to the reduction of the power consumption.

Figure 16:
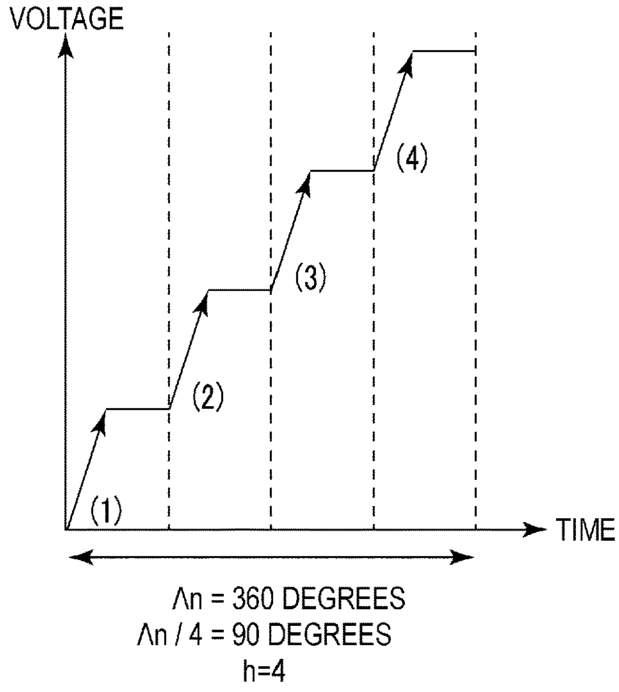
FIG. 16 depicts an example of a drive waveform according to another embodiment.
Figure 17:
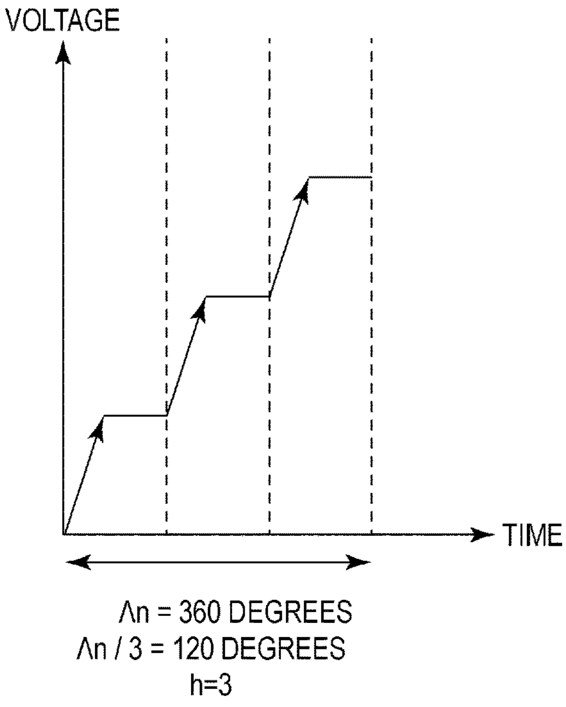
FIG. 17 depicts an example of a drive waveform according to another embodiment.

As an example of the ejection waveform described above, an example in which the number of steps (the number of times) is set as four steps (four times) in the rising waveform is illustrated in FIG. 16, and an example in which the number of steps of the rising waveform is set as three steps is illustrated in FIG. 17. In FIG. 16, h that is each number of steps is illustrated in parentheses. Note that it is obvious that the same may be applied to the falling waveform. As illustrated in FIGS. 16 and 17, the optimum holding time of each step in a case where it is assumed that the potential difference of each step is the same, and the pressure oscillation is not attenuated becomes λn/the number of steps (h). Therefore, in the potential difference displacements from the first step to the h-th step, if any two phase differences (time intervals) are in the range of $(k/2-1/6)\lambda n$ to $(k/2+1/6)\lambda n$, the parasitic oscillation occurring due to the two corresponding potential difference displacements weakens each other. For example, the time interval of the first to third potential difference displacements of FIG. 16 becomes λn/2, Tij when i=1, and j=3 satisfies Numerical Expression 7. Also, the time intervals of the second and fourth potential difference displacements of FIG. 16 become λn/2, and Tij when i=2, and j=4 also satisfies Numerical Expression 7. Therefore, the parasitic oscillation weakens each other.

Note that the pressure oscillation in the pressure chamber 46 is also attenuated over time due to the viscous resistance of the ink. The parasitic oscillation is generally more attenuated over time than main acoustic oscillation. For this reason, the potential difference change from 0.5 AL before ejection to immediately after ejection has greater influence on satellites and print quality than the potential difference change in the time range before ejection from 1.5 AL to 0.5 AL. The potential difference change from 1.5 AL to 0.5 AL before ejection (the range in which the main acoustic oscillation described above strengthen each other) has a greater influence on satellites and print quality than the potential difference change in the time range before 1.5 AL. Therefore, in the ejection waveform, it is desirable that the value of Tm or Tij, which is nearer (before or after) the ejection, is adjusted so that a condition in which the parasitic oscillation weakens each other is satisfied.

Also, even if such an ejection waveform has three or more steps, if the waveform is symmetrical in the front-rear direction, it can be considered that oscillation caused by the phase of the synthesized wave of the ejection waveform is oscillation of which the phase is advanced by $-\pi/2$ if the center position (0) of the symmetrical shape is used as the phase reference. Therefore, even if the ejection waveform has three or more steps, the cancellation waveform can weaken the residual oscillation by inputting the synthesized wave of (7), (8), (9), and (10) of which the phase difference in the main acoustic oscillation with respect to the ejection waveform is within 180 degrees±60 degrees.

Also, for the sake of simplicity, the cancellation waveform can be two trapezoidal waves having the Cp3 width, but the embodiment is not limited thereto. The cancellation waveform may have an arbitrary shape so long as the time interval Tm2 between waves is set so that the phase difference in the parasitic oscillation with the cycle λn will be within 180 degrees±60 degrees, the parasitic oscillation by the waveform of the arbitrary shape weakens each other and can suppress the generation of the parasitic oscillation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle plate including a nozzle;

a pressure chamber fluidly connected to the nozzle;

an actuator configured to vary a volume of the pressure chamber in response to a driving signal; and a drive circuit configured to generate the driving signal for driving the actuator, wherein the driving signal generated by the drive circuit includes an ejection waveform for ejecting liquid from the nozzle and a cancellation waveform for suppressing residual oscillation after the ejection of the liquid, the cancellation waveform includes a first waveform portion and a second waveform portion, and the second waveform portion cancels oscillation that has an acoustic resonance frequency higher than a main acoustic resonance frequency of the liquid in the pressure chamber and is caused by the first waveform portion, and when a cycle of the acoustic resonance frequency higher than the main acoustic resonance frequency is λn, a time interval Tm2 of the first and second waveform portions satisfies:

$$(kkk/2-1/6)\,\lambda n \leq Tm2 \leq (kkk/2+1/6)\,\lambda n,$$

where kkk is an odd number of 1 or more.

2. The liquid ejection head according to claim 1, wherein the first waveform portion and the second waveform portion have the same shape.

3. The liquid ejection head according to claim 1, wherein the ejection waveform includes a first potential change in at least two stages and a second potential change in at least two stages, the first and second potential changes being with opposite polarities.

4. The liquid ejection head according to claim 3, wherein a time width between a start of the first potential change and a start of the second potential change is approximately equal to an acoustic length of the main acoustic resonance frequency.

5. The liquid ejection head according to claim 1, wherein the first waveform portion includes first and second potential changes with opposite polarities, and the second waveform portion includes third and fourth potential changes with opposite polarities.

6. The liquid ejection head according to claim 1, wherein the drive circuit includes a switching circuit that connects an electrode and a voltage source, and potential changes in the driving signal are generated by switching of the switching circuit.

7. The liquid ejection head according to claim 1, wherein the actuator is a piezoelectric actuator.

8. A liquid ejection head, comprising:

a nozzle plate including a nozzle;

a pressure chamber fluidly connected to the nozzle;

an actuator configured to vary a volume of the pressure chamber in response to a driving signal; and a drive circuit configured to generate the driving signal for driving the actuator, wherein the driving signal generated by the drive circuit includes an ejection waveform for ejecting liquid from the nozzle and a cancellation waveform for suppressing residual oscillation after the ejection of the liquid, the cancellation waveform includes a first waveform portion and a second waveform portion, and the second waveform portion cancels oscillation that has an acoustic resonance frequency higher than a main acoustic resonance frequency of the liquid in the pressure chamber and is caused by the first waveform portion, the first waveform portion includes first and second potential changes with opposite polarities, the second waveform portion includes third and fourth potential changes with opposite polarities, the ejection waveform includes a first potential change in at least two stages and a second potential change in at least two stages, the first and second potential changes being with opposite polarities, and a time width between a midpoint between a start of the first stage of the first potential change and a start of the second stage of the second potential change in the ejection waveform and a midpoint between a start of the first potential change in the first waveform portion and a start of the fourth potential change in the second waveform portion is a multiple of an acoustic length of the main acoustic resonance frequency.

9. The liquid ejection head according to claim 8, wherein the polarity of the first potential change in the ejection waveform is the same as the first potential change in the first waveform portion of the cancellation waveform.

10. The liquid ejection head according to claim 9, wherein the time width is an odd multiple of the acoustic length.

11. The liquid ejection head according to claim 9, wherein the time width is approximately three times the acoustic length.

12. The liquid ejection head according to claim 8, wherein the polarity of the first potential change in the ejection waveform is the opposite of the first potential change in the first waveform portion of the cancellation waveform.

13. The liquid ejection head according to claim 12, wherein the time width is an even multiple of the acoustic length.

14. The liquid ejection head according to claim 12, wherein the time width is approximately two times the acoustic length.

15. The liquid ejection head according to claim 8, wherein a time width of each stage in the ejection waveform is greater than a time width between the first and second potential changes in the first waveform portion of the cancellation waveform.

16. An image forming apparatus, comprising:

a liquid ejection head; and a sheet conveyor configured to convey a sheet to the liquid ejection head, wherein the liquid ejection head includes:

a nozzle plate including a nozzle;

a pressure chamber fluidly connected to the nozzle;

an actuator configured to vary a volume of the pressure chamber in response to a driving signal; and a drive circuit configured to generate the driving signal for driving the actuator, the driving signal generated by the drive circuit includes an ejection waveform for ejecting liquid from the nozzle and a cancellation waveform for suppressing residual oscillation after the ejection of the liquid, the cancellation waveform includes a first waveform portion and a second waveform portion, and the second waveform portion cancels oscillation that has an acoustic resonance frequency higher than a main acoustic resonance frequency of the liquid in the pressure chamber and is caused by the first waveform portion, and when a cycle of the acoustic resonance frequency higher than the main acoustic resonance frequency is λn, a time interval Tm2 of the first and second waveform portions satisfies:

$$(kkk/2-1/6)\,\lambda n \leq Tm2 \leq (kkk/2+1/6)\,\lambda n,$$

where kkk is an odd number of 1 or more.

17. The image forming apparatus according to claim 16, wherein the first waveform portion includes first and second potential changes with opposite polarities, and the second waveform portion includes third and fourth potential changes with opposite polarities.

18. The image forming apparatus according to claim 17, wherein the ejection waveform includes a first potential change in at least two stages and a second potential change in at least two stages, the first and second potential changes being with opposite polarities, and a time width between a midpoint between a start of the first stage of the first potential change and a start of the second stage of the second potential change in the ejection waveform and a midpoint between a start of the first potential change in the first waveform portion and a start of the fourth potential change in the second waveform portion is a multiple of an acoustic length of the main acoustic resonance frequency.

* * * * *